(12) United States Patent
Felder et al.

(10) Patent No.: US 12,441,909 B2
(45) Date of Patent: Oct. 14, 2025

(54) HYDROPHOBIC COATING COMPOSITIONS

(71) Applicant: MOMENTIVE PERFORMANCE MATERIALS INC., Waterford, NY (US)

(72) Inventors: Thorsten Felder, Leverkusen (DE); Jan Engelhardt, Leverkusen (DE); Anita Witossek, Langenfeld (DE); Jörg Hermann, Leichlingen (DE)

(73) Assignee: Momentive Performance Materials Inc., Niskayuna, NY (US)

( * ) Notice: Subject to any disclaimer, the term of this patent is extended or adjusted under 35 U.S.C. 154(b) by 625 days.

(21) Appl. No.: 17/793,823

(22) PCT Filed: Jan. 14, 2021

(86) PCT No.: PCT/US2021/013413
§ 371 (c)(1),
(2) Date: Jul. 19, 2022

(87) PCT Pub. No.: WO2021/154504
PCT Pub. Date: Aug. 5, 2021

(65) Prior Publication Data
US 2023/0055656 A1 Feb. 23, 2023

Related U.S. Application Data

(60) Provisional application No. 62/966,219, filed on Jan. 27, 2020.

(51) Int. Cl.
*C09D 183/04* (2006.01)
*C08G 77/38* (2006.01)
*C08G 77/46* (2006.01)
*C09D 7/65* (2018.01)

(52) U.S. Cl.
CPC ........... *C09D 183/04* (2013.01); *C08G 77/38* (2013.01); *C08G 77/46* (2013.01); *C09D 7/65* (2018.01)

(58) Field of Classification Search
CPC ...... C09D 183/04; C09D 7/65; C09D 175/04; C08G 77/38; C08G 77/46; C08G 77/14; C08G 77/18; C08G 18/61; C08G 18/7831; C08G 77/50; C08L 75/04; C08L 83/04

See application file for complete search history.

(56) References Cited

U.S. PATENT DOCUMENTS

| | | | |
|---|---|---|---|
| 4,833,187 A | 5/1989 | Sittenhaler et al. | |
| 8,754,145 B1 | 6/2014 | Haubrich et al. | |
| 2003/0114583 A1* | 6/2003 | Stark | C08F 220/12 524/588 |
| 2010/0075057 A1* | 3/2010 | Krannich | C09D 133/066 524/588 |
| 2015/0291739 A1 | 10/2015 | Schurek | |
| 2018/0371248 A1* | 12/2018 | Hoffmüller | C09D 5/1675 |

FOREIGN PATENT DOCUMENTS

| | | |
|---|---|---|
| JP | H08120224 A | 5/1996 |
| JP | 2016513156 A | 5/2016 |
| JP | 2018512468 A | 5/2018 |
| JP | 2018528289 A | 9/2018 |
| WO | 2017012714 A1 | 1/2017 |

OTHER PUBLICATIONS

1st Japanese Office Action from Japanese Patent Application No. 2022-544,667 dated Nov. 5, 2024.

* cited by examiner

*Primary Examiner* — Doris L Lee
(74) *Attorney, Agent, or Firm* — James C. Abruzzo

(57) ABSTRACT

A coating composition is provided herein, wherein the coating composition includes an organic binder and a polyorganosiloxane, optionally with a hardener. There is also provided a process for making the same coating composition.

20 Claims, No Drawings

HYDROPHOBIC COATING COMPOSITIONS

CROSS-REFERENCE TO RELATED APPLICATIONS

The present application is a U.S. National Phase Application of International Application No. PCT/US2021/013413, filed on Jan. 14, 2021; to which priority is claimed from U.S. Application Ser. No. 62/966,219, filed Jan. 27, 2020, the entire contents of which are incorporated herein by reference.

FIELD

The present invention relates to coating compositions comprising organic binders and a polyorganosiloxane, which can be used in architectural and/or industrial applications.

BACKGROUND

Coating compositions based on organic binders are popular for use in architectural and industrial applications. The binder is a significant ingredient of a coating composition, which can be dispersed either in molecular form (in water or organic solvent to form a true solutions) or as colloidal dispersions (emulsions or sols). The binder forms a continuous film of a polymer (resin) on a substrate surface and helps the coating to adhere to the substrate. A coating composition can be part of a one-part system comprising a binder, or a two-part system comprising a binder and a hardener. The coating composition, either a one-part or a two-part system, can be converted to a respective functional coating system by including an additive. The coating compositions may have varying degrees of hydrophobicity, easy removal of stains or graffiti, microbial resistance, durability or other related benefits, which may depend on binder chemistry, type and loading of a filler, and presence of other additives.

Graffiti damage has been an increasingly growing concern. Today most people view graffiti damage not as an art form but as a form of vandalism and property destruction when the graffiti is not desired. Graffiti is mostly found in institutions such as schools, public and private buildings, automobiles, trucks, trains, cars and public rest rooms and, in open areas such as support walls for bridges, inner walls of buildings and park structures. The vast majority of graffiti is created with oil-based paints including enamels, epoxies, lacquers and urethanes, which are applied by spray cans. Conventionally, removal of unwanted graffiti has been performed by sandblasting the graffiti from the substrate. However, this method is expensive and hazardous to health due to the emission of potential carcinogenic particles. Moreover, the method causes damage to the coating surface. No long-term solutions are offered by the use of this method and the surface will likely be repainted with new damaging graffiti.

Another method commonly used is by treating the substrate with chemicals. In this case, the chemicals often destroy the surface and, are generally hazardous, as they require handling with highly caustic solutions. A search for more ecofriendly solutions is highly desired. On the other hand, household and exterior stains in architectural coatings are usually removed by soap, water or high pressure washing with water. It is desired to have inbuilt stain-resistance or easy-to-clean properties in such coatings for lower maintenance needs.

Some stains can be resisted by higher hydrophobicity, and one way of enhancing that is to add silicone-based compounds/additives to the coating. Silicones were used for same objective in one example in U.S. Pat. No. 4,833,187. These silicones were based on functionalized polydimethylsiloxanes (PDMS) or PDMS-organic hybrids, and were generally not reactive with the organic binder (the functional group of PDMS cannot chemically react with a functional group of the binder) and have consequently some disadvantages such as blooming and leaching to the surface causing oily patches or tackiness on a coating, which will not give consistent and durable coating performance. Hence these silicones have attained only limited acceptance as compounds to be incorporated into architectural or industrial coatings.

SUMMARY OF THE INVENTION

The inventors herein have surprising discovered that the coating composition of the present invention exhibits an increase in the hydrophobicity, anti-graffiti, anti-icing, anti-dirt, anti-fingerprint, anti-stain, anti-fog, and/or easy stain removal. The coating composition comprises (i) an organic binder, and (ii) a polyorganosiloxane of formula (I), $Z^1$-$L^1$\{[Si(R)(R')O]$_p$—SiR"$_2$\}$_m$-$L^2$-$Z^2$, as described herein.

In the polyorganosiloxane of formula (I), the subscript p>9; the subscript m is an integer of from 1 to 5; each R, R' or R" is selected from the group consisting of a saturated hydrocarbon substituent selected from the group consisting of a monovalent alkyl containing from 1 to 22 carbon atoms, optionally substituted by F or a —OH group, an aryl containing from 6 to 22 carbon atoms, a polycyclic aryl containing from 8 to 22 carbon atoms, an alkylaryl containing from 7 to 23 carbon atoms, and an arylalkyl group containing from 7 to 22 carbon atoms, and H, or $L^1$-$Z^1$ or $L^2$-$Z^2$, and each R, R' and R" can be same or different; each $L^1$ or $L^2$ is selected from the group consisting of a single bond, a divalent alkylene group having at least two carbon atoms, optionally interrupted by one or more of —O—, —$NR^3$—C(O)—, and/or —$NR^3$—, —OC(O)$NR^3$—, —$NR^3$—C(O)—$NR^3$— moieties bonded via carbon bond of $L^1$ or $L^2$ to the silicon atom of the respective siloxy unit of the polyorganosiloxane (I), and optionally substituted by one or more OH groups, or is a trivalent group, and wherein $L^1$ and $L^2$ can be same or different, and wherein $R^3$ is hydrogen, Me$_3$Si— or an alkyl containing from 1 to 8 carbon atoms; $Z^1$ or $Z^2$ independently is a monovalent group selected from the group consisting of R, R', R", $R^1$, an alkylarylalkyl containing from 8 to 22 carbon atoms, an aryl ether containing from 6 to 22 carbon atoms, a cycloalkyl containing from 6 to 22 carbon atoms, a cycloalkylalkylene containing from 7 to 22 carbon atoms, a bicycloalkyl containing from 7 to 22 carbon atoms, cyclothioalkyl containing from 6 to 12 carbon atoms, an aryl containing 5 to 12 carbon atoms and a hetero atom selected from the group consisting of —N, —O, and —S, an alkyl aldehyde containing from 1 to 20 carbon atoms, and an alkylaryl aldehyde containing from 7 to 20 carbon atoms, and wherein $Z^1$ or $Z^2$ is optionally substituted by an alkyl of from 1 to 8 carbon atoms; and, each $R^1$ is a monovalent unsaturated, unsubstituted or substituted alkenyl or alkynyl group selected from the group consisting of an alkenyl containing from 2 to 22 carbon atoms, a cycloalkenyl containing from 6 to 22 carbon atoms, a bicycloalkenylalkylene containing from 7 to 22 carbon atoms, an acrylate group, a methacrylate group, an alkynyl containing from 2 to 22 carbon atoms, and oxiranyl and carbonate derivatives of the respective $R^1$ groups, and oxiranyl groups containing 3 to 22 carbon atoms, carbonate groups containing from 4 to 23 carbon atoms, Cl, Br, I, —SH, —S—R, —OH, —O—R, —CN, —NCO, and blocked —NCO, $(X)_x(Y)_{3-x}Si—$, $R^6{}_xR'_{3-x}Si—$, a polyether group, carboxy (—COOH), diacids, diesters, a polyester group, nitro-alkyl-, cyano-alkyl-, acyl- or alkyl sulfonyl fluoride- groups and, an ionic group derived from an ester of a carboxylic acid, S or P acid, phosphines, an amino group, a primary amine, a secondary amine, a tertiary amine, a keto group, and betaines, and =R is as defined above, and the subscript x is an integer of from 1 to 3, X and Y are each selected from the group consisting of OH, OR', —N(R')$_2$, R' O(O)—O— and R', wherein R' is as defined above, and X and Y can be same or different, and wherein each $R^6$ is an aryl containing from 6 to 10 carbon atoms, an arylalkyl containing from 7 to 12 carbon atoms, a cycloalkyl containing from 6 to 12 carbon atoms, a bicycloalkyl containing from 7 to 16 carbon atoms, an epoxy alkyl containing from 3 to 12 carbon atoms, epoxy cycloalkyl containing from 6 to 12 carbon atoms, an epoxy bicycloalkyl containing from 7 to 16 carbon atoms, thiocycloalkyl containing from 6 to 12 carbon atoms, and an aryl containing from 5 to 12 carbon atoms and containing hetero substitutions of one or more of a —N, —O, and —S— atom.

The coating composition, exhibits an increase in the hydrophobicity, anti-graffiti, and/or easy stain removal compared to the coating formulation without any additive.

In another embodiment, there is provided a process of making a coating composition which comprises, combining the organic binder (i); and the polyorganosiloxane (ii) of formula (I).

DETAILED DESCRIPTION OF THE INVENTION

In one embodiment herein, it will be understood that all ranges herein include all subranges there between. In another specific embodiment herein, it will be understood that all listings of members of a group can further comprise combinations of any two or more of the members of said group.

In the specification and claims herein, the following terms and expressions are to be understood as indicated.

The singular forms "a," "an," and "the" include the plural, and reference to a numerical value includes at least that particular value, unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

All methods described herein may be performed in any suitable order unless otherwise indicated herein or otherwise clearly contradicted by context. The use of any and all examples, or exemplary language (e.g., "such as") provided herein, is intended merely to better illustrate the invention and does not pose a limitation on the scope of the invention unless otherwise claimed.

No language in the specification should be construed as indicating any non-claimed element as essential to the practice of the invention.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

As used herein, the term "alkyl" means any monovalent, saturated straight, branched or cyclic hydrocarbon group. Examples of alkyls include methyl, ethyl, propyl and isobutyl.

As used herein, the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkenyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C6 aliphatic radical comprising a methyl group, the methyl group being a functional group which is an alkyl group. Similarly, the 4-nitrobut-1-yl group is a C4 aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C1 aliphatic radical. A decyl group (i.e., CH$_3$(CH$_2$)$_9$—) is an example of a C10 aliphatic radical.

As used herein, the term "cycloaliphatic radical" refers to a radical having a valence of at least one, and comprising an array of atoms which is cyclic, but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a C6 cycloaliphatic radical comprising a methyl group, the methyl group being a functional group which is an alkyl group. Similarly, the 2-nitrocyclobut-1-yl radical is a C4 cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., $C_6H_{10}C(CF_3)_2C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., $CH_3CHBrCH_2C_6H_{10}O$—), and the like. Further examples of cycloaliphatic radicals include 4-allyloxycyclohex-1-yl, 4-aminocyclohex-1-yl (i.e., $H_2C_6H_{10}$—), 4-aminocarbonylcyclopent-1-yl (i.e., $NH_2COC_5H_8$—), 4-acetyloxycyclohex-1-yl, 2,2-dicyanoisopropylidenebis(cyclohex-4-yloxy) (i.e., —$OC_6H_{10}C(CN)_2C_6H_{10}O$—), 3-methylcyclohex-1-yl, methylenebis(cyclohex-4-yloxy) (i.e., —$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —$OC_6H_{10}(CH_2)_6C_6H_{10}O$—), 4-hydroxymethylcyclohex-1-yl (i.e., 4-$HOCH_2C_6H_{10}$—), 4-mercaptomethylcyclohex-1-yl (i.e., 4-$HSCH_2C_6H_{10}$—), 4-methylthiocyclohex-1-yl (i.e., 4-$CH_3SC_6H_{10}$—), 4-methoxycyclohex-1-yl, 2-methoxycarbonylcyclohex-1-yloxy (2-$CH_3OCOC_6H_{10}O$—), 4-nitromethylcyclohex-1-yl (i.e., $NO_2CH_2C_6H_{10}$—), 3-trimethylsilylcyclohex-1-yl, 2-t-butyldimethylsilylcyclopent-1-yl, 4-trimethoxysilylethylcyclohex-1-yl (e.g., $(CH_3O)_3SiCH_2CH_2C_6H_{10}$—), 4-vinylcyclohexen-1-yl, vinylidenebis(cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7O$—) represents a C4 cycloaliphatic radical. The cyclohexylmethyl radical ($C_6H_{11}CH_2$—) represents a C7 cycloaliphatic radical.

As used herein, the term "aromatic" or "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly, a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a C7 aromatic radical comprising a methyl group, the methyl group being a functional group which is an alkyl group. Similarly, the 2-nitrophenyl group is a C6 aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —$OPhC(CF_3)_2PhO$—), 4-chloromethylphen-1-yl, 3-trifluorovinyl-2-thienyl, 3-trichloromethylphen-1-yl (i.e., 3-$CCl_3Ph$-), 4-(3-bromoprop-1-yl)phen-1-yl (i.e., 4-$BrCH_2CH_2CH_2Ph$-), and the like. Further examples of aromatic radicals include 4-allyloxyphen-1-oxy, 4-aminophen-1-yl (i.e., 4-$H_2NPh$-), 3-aminocarbonylphen-1-yl (i.e., $NH_2COPh$-), 4-benzoylphen-1-yl, dicyanomethylidenebis(4-phen-1-yloxy) (i.e., $OPhC(CN)_2PhO$—), 3-methylphen-1-yl, methylenebis(4-phen-1-yloxy) (i.e., $OPhCH_2PhO$—), 2-ethylphen-1-yl, phenylethenyl, 3-formyl-2-thienyl, 2-hexyl-5-furanyl, hexamethylene-1,6-bis(4-phen-1-yloxy) (i.e., $OPh(CH_2)_6PhO$—), 4-hydroxymethylphen-1-yl (i.e., 4-$HOCH_2Ph$-), 4-mercaptomethylphen-1-yl (i.e., 4-$HSCH_2Ph$-), 4-methylthiophen-1-yl (i.e., 4—$CH_3SPh$-), 3-methoxyphen-1-yl, 2-methoxycarbonylphen-1-yloxy (e.g., methyl salicyl), 2-nitromethylphen-1-yl (i.e., 2-$NO_2CH_2Ph$), 3-trimethylsilylphen-1-yl, 4-t-butyldimethylsilylphen-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a C3 aromatic radical. The benzyl radical ($C_7H_7$—) represents a C7 aromatic radical.

As used herein, the term "non-hydrolysable" refers to the group which is not easily cleavable by the addition of water, hydroxide anions or in full analogy by addition of an alcohol or alkoxide anions. In case of water or alcohols, in particular under acidic or basic conditions, the group is not easily cleavable. The term "non-hydrolysable" shall indicate that the groups are preferably bonded to the silicon atom by a C—Si bond, and accordingly the non-hydrolyzable group is preferably an organyl group.

As used herein, the term "hydrolysable" refers to the group which is easily cleavable by the addition of water, hydroxide anions, an alcohol, or an alkoxide anions. In case of water or alcohols, in particular, under acidic or basic conditions, the group is easily cleavable. The term "hydrolysable" indicates the groups which are not bonded to the silicon atom by a C—Si bond, but by an Si—X bond, wherein X is Cl, Br or I, an Si—O bond, as is the case in hydroxy, hydrocarbylcarbonyloxy and hydrocarbyloxy groups, an Si—N bond, an Si—S bond or an Si—H bond.

There is provided herein a coating composition, comprising (i) an organic binder; and (ii) a polyorganosiloxane. In one or more embodiments, the coating composition exhibits an increase in the hydrophobicity, anti-graffiti, anti-icing, anti-dirt, anti-fingerprint, anti-fog and/or easy stain removal compared to a coating without an additive.

In some embodiments of the coating composition, the polyorganosiloxane is either hydrolyzable or hydrolyzed. In these embodiments, the polyorganosiloxane can be an alkoxy-functionalized ("hydrolyzable" or "partially hydrolyzed") and/or silanol-functionalized silicone ("fully hydrolyzed") and/or a combination. In other words, the coating compositions of the present invention comprise an alkoxy-functional silicone, a silanol-functional silicone, or a mixture thereof. As used herein, the term "alkoxy-functionalized and/or silanol-functionalized silicone" refers to silicones comprising alkoxy functional groups, —OR, and/or hydroxy functional groups, —OH, wherein R is an alkyl group or an aryl group, and wherein the —OH group or the —OR group is directly bonded to a silicon atom (i.e. —SiOH or —Si(OR)). In some embodiments, the alkoxy functional groups and/or hydroxy functional groups can be hydrolyzed at least in some extent and up to 100%.

In some embodiments, a coating composition is provided, which exhibits high hydrophobicity, anti-graffiti, anti-icing, anti-dirt, anti-fingerprint, anti-stain, anti-fog, and/or easy stain removal properties. In such embodiments, the coating composition comprises (i) an organic binder, and (ii) a polyorganosiloxane of formula I,

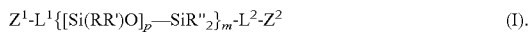

wherein the subscript p>9, wherein the subscript m is an integer of from 1 to 5, wherein each R, R' or R" is a saturated hydrocarbon substituent selected from the group consisting of a monovalent alkyl containing from 1 to 22 carbon atoms, optionally substituted by F or a —OH group, an aryl containing from 6 to 22 carbon atoms, a polycyclic aryl containing from 8 to 22 carbon atoms, an alkylaryl containing from 7 to 23 carbon atoms, and an arylalkyl containing from 7 to 22 carbon atoms, and H, or $L^1$-$Z^1$ or $L^2$-$Z^2$, and wherein each R, R' and R" can be same or different.

In formula 1, $L^1$ or $L^2$ is a single bond, a divalent or trivalent group, $L^1$ or $L^2$ can be selected from the group consisting of a divalent alkylene group having at least two carbon atoms. Optionally, the divalent alkylene group is interrupted by one or more —O—, —NR³—C(O)—, —NR³—, —OC(O)NR³—, and/or —NR³—C(O)—NR³— moieties bonded via carbon bond of $L^1$ or $L^2$ to the silicon atom of the siloxy unit of the polyorganosiloxane (I), wherein R³ is hydrogen, Me₃Si— or C1-C8-alkyl. Further, the divalent alkenyl group is substituted by one or more OH groups. In some preferred embodiments, $L^1$ or $L^2$ is a divalent C2-C12-alkylene group, a divalent C2-C4 alkylene group. In some embodiments, $L^1$ or $L^2$ is —(CH₂)₂— and/or —(CH₂)₃—. In all such embodiments, the $L^1$ and $L^2$ can be same or different.

The $Z^1$ or $Z^2$ of formula 1 is a monovalent group, selected from the group consisting of R, R', R", R¹, monovalent unsubstituted or substituted C1-C30 hydrocarbons, C8-C22-alkylarylalkyl, C6-C22-aryl ether, C6-C22-cycloalkyl, C7-C22-cycloalkylalkylene, C7-C22 bicycloalkyl, C6-C12-cyclothioalkyl, C5-C12-hetero-N, —O—, —S-aryl, C1-C20-alkyl aldehydes, and C7-C20-alkylaryl aldehydes, optionally substituted by C1-C8-alkyl, OH, Cl, or Br, and a silyl ether group R¹₃Si—O— wherein R¹ is selected from a monovalent unsaturated, unsubstituted or substituted alkenyl or alkynyl group selected from the group consisting of an alkenyl containing from C2-C22-alkenyl, C6-C22-cycloalkenyl, C7-C22-bicycloalkenylalkylene, C2-C22-alkynyl, and oxiranyl and carbonate derivatives of respective R¹, C3-C22-oxiranyl groups, C4-C23-carbonate compounds, or a group selected from Cl, Br, I, —SH, —S—R, —OH, —O—R, —CN, —NCO, blocked NCO, or R¹ is a group selected from $(X)_x(Y)_{3-x}Si$—, or $(R'X)_xR'_{3-x}Si$—, $R^6_xR'_{3-x}Si$—, a polyether group, carboxy (—COOH), diacids, diesters, a polyester group, nitro-alkyl-, cyano-alkyl-, acyl- or alkyl sulfonyl fluoride- groups and, an ionic group derived from an ester of a carboxylic acid or sulphonic acid, or phosphonic acid, phosphonate, phosphines, amines, a keto group, and betaines, and wherein R' is as defined above, and the subscript x is an integer of from 1 to 3, X and Y are each selected from the group consisting of OH, OR', —N(R')₂, R' O(O)—O—, and R', wherein R' is as defined above, and X and Y can be same or different, and wherein each R⁶ is an aryl containing from 6 to 10 carbon atoms, an arylalkyl containing from 7 to 12 carbon atoms, a cycloalkyl containing from 6 to 12 carbon atoms, a bicycloalkyl containing from 7 to 16 carbon atoms, an epoxy alkyl containing from 3 to 12 carbon atoms, an epoxy cycloalkyl containing from 6 to 12 carbon atoms, an epoxy bicycloalkyl containing from 7 to 16 carbon atoms, thiocycloalkyl containing from 6 to 12 carbon atoms, and an aryl containing from 5 to 12 carbon atoms, wherein the aryl, alkylaryl, or cycloalkyl contains hetero substitutions of one or more of a —N, —O, and —S— atom.

As noted, the R¹ is a group selected from an ionic group derived from an ester of a carboxylic acid or sulphonic acid or phosphonic acid, such as —C(O)—)—O—R³, (R³O)₂—P(O)—O—, (R³O)₂—P(O)—, phosphonates (R³—O)₂—P—, phosphines, amines, betaines, such as —NHR³—CH₂—COOH, —NHR³—CH₂—O—S(O)₂(OH), —S—S(O)₂(OR₃), and a primary, secondary, tertiary amine —N(R³)₂ or phosphine —P(R³)₂, and an acid addition salt of an amine or phosphine, preferably salts having quaternary —N⁺R²₃ or —P⁺R²₃ groups, and alkyl or aryl enamine. R³ is hydrogen, C1-C8 alkyl, C2-C8 alkenyl bonded via a single bond or carbon bond of $L^1$ or $L^2$ to the silicon atom of the siloxy unit of the polyorganosiloxane (I).

In one embodiment, R¹ is selected from —C(O)—O—R³, (R³O)₂—P(O)—O—, (R³O)₂—P(O)—, phosphonates (R³—O)₂—P—, —NR³—CH₂—COOH, —NR³—CH₂—O—S(O)₂(OH), —S—S(O)₂(OR₃), —N(R³)₂, —P(R³)₂, an acid addition salt of an amine, salts having quaternary —N⁺R²₃ or —P⁺R²₃ groups, an alkyl or aryl enamine of the formula (II):

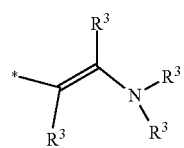

(II)

wherein $R^3$ is hydrogen or an alkyl of from 1 to 8 carbon atoms, and an alkenyl containing from

2 to 8 carbon atoms which is bonded

via a single bond or a carbon bond of $L^1$ or $L^2$ to the silicon atom of the respective siloxy unit of the polyorganosiloxane (I).

In one or more embodiments, $Z^1$ or $Z^2$ of formula (I) as defined herein may be, optionally contain one or more groups selected from —O—, —NH—, —C(O)—, —C(S)—, tertiary amino groups ( ) and quaternary ammonium groups ( ) and organosilyl groups. In some embodiments, $Z^1$ or $Z^2$ as defined herein may be optionally substituted by an alkyl of from 1 to 8 carbon atoms, OH, Cl, or Br, and a silyl ether group $R^1{}_3Si$—O—, wherein $R^1$ is as defined above for formula (I), and wherein $R^1$ is preferably an alkyl group of from 1 to 8 carbon atoms, most preferably Me, and $Z^1$ or $Z^2$ can be selected from the group consisting of a poly-C2-C4-alkylene oxide, which can be OH— or oxyalkyl- of 1 to 8 carbon atoms, or oxycarbonyl alkyl-terminated of from 1 to 8 carbon atoms, vinyl, allyl, hexenyl, octenyl, allyloxypropyl, —CH$_2$C≡CH, —C(O)C≡CH, —C(O)(CH$_2$)$_8$CH═CH$_2$, cyclohexenylethyl, limonyl, norbornenylethyl, vinylphenylethyl, allyloxyphenyloxypropyl, —(OCH$_2$CH$_2$O)$_a$—(OCH$_2$CH(CH$_3$))$_b$—(OCH$_2$CH$_2$CH(CH$_3$))$_c$—OCH═CH$_2$, or —(OCH$_2$CH$_2$)$_a$—(OCH$_2$CH(CH$_3$))$_b$—(OCH$_2$CH$_2$CH(CH$_3$))$_c$—OH, —(OCH$_2$CH$_2$)$_a$—(OCH$_2$CH(CH$_3$))$_b$—(OCH$_2$CH$_2$CH(CH$_3$))$_c$—O-alkyl containing 1 to 4 carbon atoms, or —(OCH$_2$CH$_2$)$_a$—(OCH$_2$CH(CH$_3$))$_b$—(OCH$_2$CH$_2$CH(CH$_3$))$_c$—O—C(O)-alkyl of from 1 to 4 carbon atoms, with a, b, c being 0 to 20 and a+b+c=1 to 20, —[—Si(CH$_3$)$_2$OSi(CH$_3$)$_2$]CH═CH$_2$, and

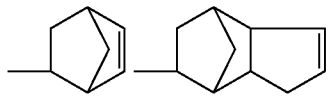

$(X)_x(Y)_{3-x}Si$—, or $(R'X)_xR'_{3-x}Si$—, wherein R' is as defined above, and the subscript x is an integer of from 1 to 3, X and Y are each selected from the group consisting of OH, OR', —N(R')$_2$, R' C(O)—O—, and of unsubstituted or substituted oxyphenyl moieties of the formula

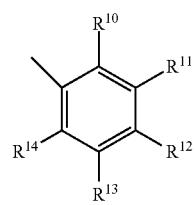

wherein $R^{10}$ and $R^{14}$ are each hydrogen or $R^1$ as defined as above, and $R^{11}$, $R^{12}$, $R^{13}$ are selected from —OR with R=H or an alkyl of from 1 to 8 carbon atoms, wherein at least one of the groups $R^{11}$ to $R^{13}$ is OH, and selected from eugenol, bisphenolethers, cumylphenolether, glycidylpropylether, epoxylimonyl, epoxycyclohexanethyl, epoxynorbornyl,

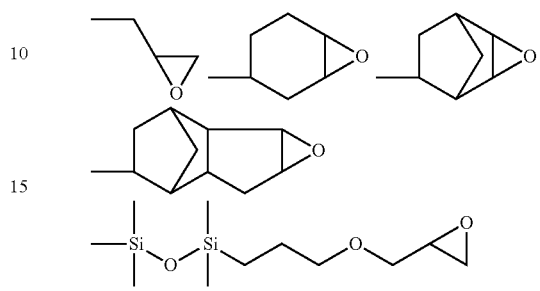

and the carbonate derivatives of these epoxides, tetrahydro-2H-thiopyranyl, carbazole, indole, trisphenylsilyl, and $R^6Me_2Si$—, wherein $R^6$ is as defined herein and is optionally substituted by alkyl of from 1 to 8 carbon atoms, OH, Cl, CN, and a silyl ether group $R_3Si$—O—, and a group selected from Cl, —S—H, —NCO, blocked NCO, and can be selected from an ionic group derived from an ester of a carboxylic acid phenyl, phenylpropyl, styryl, naphthyl, eugenol, bisphenolethers, cumylphenolether, norbornyl, vinyl, allyl, allyloxypropyl, hexenyl, norbornenyl, cyclohexenylethyl, limonyl, and glycidylpropylether, epoxylimonyl, epoxycyclohexanethyl, epoxynorbornyl, and the carbonate derivatives of these epoxides, $(X)_x(Y)_{3-x}Si$—, or $(R'X)_xR'_{3-x}Si$—, $R^6{}_xR'_{3-x}Si$—, wherein x, X and Y is as defined above and, wherein $R^6$ can in one embodiment be selected from phenyl, naphthyl, phenylethyl, phenylpropyl, eugenol, limonyl, epoxylimonyl, glycidylpropylether epoxycyclohexylethyl, norbornenylethyl, epoxy norbornenylethyl, carbazol, and indole.

Further, in some embodiments, $Z^1$ or $Z^2$ can specifically represents unsubstituted alkyl groups containing from 1 to 24 carbon atoms, specifically linear alkyl groups containing from 1 to 24 carbon atoms, poly(alkylene oxide) groups having from 2 to 24 carbon atoms, wherein the alkylene oxide units are ethylene oxide units, propylene oxide units, or a combination of these units, oxycarbonylhydrocarbyl groups containing 2 to 24 carbon atoms, in particular oxycarbonylalkyl groups containing from 2 to 24 carbon atoms, oxyalkyl groups containing from 1 to 24 carbon atoms, alkanoyl groups containing from 1 to 24 carbon atoms, or alkanoyl ester groups containing from 1 to 24 carbon atoms, wherein the alkoxide group of the alkanoyl ester group is an alkoxide group containing from 1 to 24 carbon atoms.

In some embodiments, $Z^1$ or $Z^2$ specifically represents unsubstituted alkyl groups containing from 1 to 24 carbon atoms and is selected from the group consisting of methyl, ethyl, n-propyl, n-butyl, n-pentyl, n-hexyl, n-heptyl, n-octyl, n-nonyl, n-decyl, n-undecyl or n-dodecyl groups.

According to the invention, when the group $Z^1$ or $Z^2$ represents poly(alkylene oxide) groups having from 2 to 24 carbon atoms, it preferably represents poly(ethylene oxide) groups containing 3 to 12 ethylene oxide repeating units, or poly(propylene oxide) groups containing 3 to 8 propylene oxide repeating units.

When the group $Z^1$ or $Z^2$ represents oxycarbonylalkyl groups containing from 2 to 24 carbon atoms, according to the invention, it is preferred when the alkyl group of the oxycarbonyl group is selected from the group consisting of methyl, ethyl n-propyl, n-butyl, n-pentyl, n-hexyl, n-heptyl or n-octyl groups, branched alkyl groups containing from 3 to 22 carbon atoms, such as iso-propyl, iso-butyl, tert-butyl, iso-pentyl, tert-pentyl, neo-pentyl and 2-ethylhexyl groups, and cyclic alkyl groups containing from 3 to 22 carbon atoms, such as cyclopropyl, cyclobutyl, cyclopentyl, cyclohexyl and cycloheptyl groups. It is also preferred according to the invention when the alkyl group of the oxycarbonylalkyl group is bonded to the oxycarbonyl group by a carbon atom substituted with three alkyl substituents each containing from 1 to 8 carbon atoms.

When the group $Z^1$ or $Z^2$ represents an oxyalkyl group of from 1 to 24 carbon atoms, according to the invention, the alkyl group of the oxyalkyl group containing from 1 to 24 carbon atoms is preferably selected from the group consisting of methyl, ethyl, n-propyl, n-butyl, n-pentyl, n-hexyl, n-hexyl, n-heptyl or n-octyl groups, branched alkyl groups containing from 3 to 22 carbon atoms, such as iso-propyl, iso-butyl, tert-butyl, iso-pentyl, tert-pentyl, neo-pentyl and 2-ethylhexyl groups, and cyclic alkyl groups containing from 3 to 22 carbon atoms such as cyclopropyl, cyclobutyl, cyclopentyl, cyclohexyl and cycloheptyl groups.

When the group $Z^1$ or $Z^2$ represents an alkanoyl group containing from 1 to 24 carbon atoms, according to the invention the alkanoyl group containing from 1 to 24 carbon atoms is preferably selected from the group consisting of a carboxylate —COOH, —$CH_2CO_2H$, —$(CH_2)_2CO_2H$, —$(CH_2)_3CO_2H$, —$(CH_2)_4CO_2H$, —$(CH_2)_5CO_2H$, —$(CH_2)_6CO_2H$, —$(CH_2)_7CO_2H$, —$(CH_2)_7CO_2H$, —$(CH_2)_9CO_2H$, or —$(CH_2)_{10}CO_2H$.

When the group $Z^1$ or $Z^2$ represents an alkanoyl ester group of from 1 to 24 carbon atoms, wherein the alkoxide group of the alkanoyl ester group is an alkoxide group, according to the invention the alkanoyl group is preferably selected from the group consisting of carboxylate —COOH, —$CH_2CO_2H$, $(CH_2)_2CO_2H$, $(CH_2)_3CO_2H$, $(CH_2)_4CO_2H$, $(CH_2)_5CO_2H$, $(CH_2)_6CO_2H$, $(CH_2)_7CO_2H$, $(CH_2)_7CO_2H$, $(CH_2)_9CO_2H$, or $(CH_2)_{10}CO_2H$, and the alkoxide group of the ester is preferably selected from methoxy, ethoxy, n-propoxy, iso-propoxy, n-butoxy, iso-butoxy, tert-butoxy, n-pentoxy, iso-pentoxy, neo-pentoxy or n-hexoxy groups. Particularly preferred alkanoyl ester groups according to the invention are selected from the group consisting of —COOMe, —COOEt, —COOtBu, —$CH_2CO_2Me$, —$CH_2CO_2Et$, $CH_2CO_2tBu$, —$(CH_2)_2CO_2Me$, —$(CH_2)_2CO_2Et$, —$(CH_2)_2CO_2$-tBu, —$(CH_2)_3CO_2Me$, —$(CH_2)_3CO_2Et$, —$(CH_2)_3CO_2tBu$, —$(CH_2)_4CO_2Me$, —$(CH_2)_4CO_2Et$, —$(CH_2)_4CO_2tBu$, —$(CH_2)_5CO_2Me$, —$(CH_2)_5CO_2Et$, —$(CH_2)_5CO_2tBu$, —$(CH_2)_6CO_2Me$, —$(CH_2)_6CO_2Et$ and —$(CH_2)_6CO_2tBu$. Preferably, the substituents of the hydrocarbyl radicals $Z^1$ or $Z^2$ are selected from hydroxyl groups, alkoxy groups, in particular methoxy, ethoxy, n-propoxy, iso-propoxy, n-butoxy, iso-butyoxy, tert-butoxy, n-pentoxy, iso-pentoxy, neo-pentoxy, n-hexoxy, cyclopentoxy or cyclohexoxy groups, siloxy groups, in particular —$SiMe_2$-O—, CH=$CH_2$, —$OSiMe_3$, —$OSiEt_3$, —$OSi(iPr)_3$, —$OSiPh_3$, —$OSi(cyHex)_3$, —$OSi(tBu)Me_2$, —$OSi(tBu)Ph_2$, perfluoro alkyl groups, in particular trifluoromethyl, linear perfluoroalkyl groups of the general formula —$C_xF_{2x+1}$ with x=2 to 24, pentafluorophenyl, ester groups, in particular such of the formulae —COOMe, —COOEt, —COOtBu, —$CH_2CO_2Me$, —$CH_2CO_2Et$, $CH_2CO_2tBu$, $(CH_2)_2CO_2Me$, $(CH_2)_2CO_2Et$, $(CH_2)_2CO_2tBu$, —$(CH_2)_3CO_2Me$, $(CH_2)_3CO_2Et$, $(CH_2)_3CO_2tBu$, $(CH_2)_4CO_2Me$, $(CH_2)_4CO_2Et$, $(CH_2)_4CO_2tBu$, —$(CH_2)_5CO_2Me$, —$(CH_2)_5CO_2Et$, $(CH_2)_5CO_2tBu$, $(CH_2)_6CO_2Me$, $(CH_2)_6CO_2Et$ and $(CH_2)_6CO_2tBu$, and ester groups wherein the alkoxy group is derived from a tertiary alkoxide containing from 1 to 25 carbon atoms, and polyether groups selected from the group consisting of —$(OCH_2CH_2)_a$—$(OCH_2CH(CH_3))_b$—$(OCH_2CH_2CH(CH_3))_c$—OH, —$(OCH_2CH_2)_a$—$(OCH_2CH(CH_3))_b$—$(OCH_2CH_2CH(CH_3))_c$—O-alkyl of from 1 to 4 carbon atoms, —$(OCH_2CH_2)_a$—$(OCH_2CH(CH_3))_b$—$(OCH_2CH_2CH(CH_3))_c$—O—C(O)-alkyl of from 1 to 4 carbon atoms and —$(OCH_2CH_2)_a$—$(OCH_2CH(CH_3))_b$—$(OCH_2CH_2CH(CH_3))_c$—O—$SiR_3$, with R being an alkyl of from 1 to 8 carbon atoms, a, b, c being 0 to 20 and a+b+c=1 to 20; more preferably the hydrocarbyl radical $Z^1$ or $Z^2$ comprises at the same time both a polyether group and a terminal hydroxyl group, both a polyether group and a terminal alkoxy group, or a polyether group and a terminal siloxy group as defined above.

In one or more embodiments, $Z^1$ or $Z^2$ of formula (I) further comprises at least one moiety selected from the group consisting of polyether moieties, ester moieties, and coating-matrix-reactive moieties, such as alkenyl, epoxy, acrylate, methacrylate, thiolates, hydroxyl, alkoxy, carboxy (—COOH), amino, alkoxysilyl and isocyanate, ketones, diketones, 1,3 diketones, diacids, 1,3 diacids, diesters, 1,3 diesters, CH-adjacent to carbonyl group, nitro-alkyl-, cyano-alkyl-, acyl- and alkyl sulfonyl fluoride- groups, as well as donor and acceptor groups in the Michael addition reaction. In some specific embodiments, $Z^1$ or $Z^2$ of formula (I) includes polyether moieties. The polyether moieties may comprise —$(OCH_2CH_2)_a$—$(OCH_2CH(CH_3))_b$—$(OCH_2CH_2CH(CH_3))_c$—OH, —$(OCH_2CH_2)_a$—$(OCH_2CH(CH_3))_b$—$(OCH_2CH_2CH(CH_3))_c$—O-alkyl of from 1 to 4 carbon atoms, —$(OCH_2CH_2)_a$—$(OCH_2CH(CH_3))_b$—$(OCH_2CH_2CH(CH_3))_c$—O—C(O)-alkyl of from 1 to 4 carbon atoms, and —$(OCH_2CH_2)_a$—$(OCH_2CH(CH_3))_b$—$(OCH_2CH_2CH(CH_3))_c$—O—$SiR_3$, with R being an alkyl of from 1 to 8 carbon atoms, a, b, c being 0 to 20 and a+b+c=1 to 20, more preferred are groups represented by the formula —$(OCH_2CH_2)_{3-10}$, —$(OCH_2CH_2)_{3-10}$—OH and —$(OCH_2CH(CH_3))_{3-10}$, —$(OCH_2CH(CH_3))_{3-10}$—OH.

In some embodiments, the $Z^1$ or $Z^2$ of formula (I) of the coating composition is selected from a vinyl ester of a straight chain or a branched chain carboxylic acid. In one or more embodiments, the $Z^1$ or $Z^2$ of formula (I) is selected from a vinyl ester of a straight chain carboxylic acid. In one or more embodiments, the $Z^1$ or $Z^2$ of formula (I) of the coating composition is selected from a vinyl ester of a branched chain carboxylic acid.

In some embodiments, the $Z^1$ or $Z^2$ of formula (I) can be selected from a vinyl ester of neopentanoic acid, vinyl ester of neodecanoic acid or a vinyl ester of neononanoic acid. In some embodiments, the $Z^1$ or $Z^2$ of formula (I) can be selected from a vinyl ester of neodecanoic acid or a vinyl ester of neononanoic acid.

In one or more embodiments, the $Z^1$ or $Z^2$, or both $Z^1$ and $Z^2$ of formula 1 of the coating composition is selected from a vinyl ester of a neodecanoic acid or a vinyl ester of neononanoic acid. In some embodiments, the $Z^1$ or $Z^2$ of formula (I) of the coating composition is selected from a vinyl ester of neononanoic acid. In some other embodiments, the $Z^1$ or $Z^2$ of formula (I) of the coating composition is selected from a vinyl ester of a neodecanoic acid.

As mentioned above, in some embodiments, at least one of the $Z^1$ and $Z^2$ of formula (I) is a vinyl ester of neodecanoic acid or neononanoic acid, wherein the $Z^1$ or $Z^2$, which is not representing a vinyl ester of neodecanoic acid or neononanoic acid, may be a cross linker. The cross linker may be a reactive functional group. In one or more embodiments, the reactive functional group of the cross-linker functions as a binder or as a hardener. In such embodiments, if the $Z^1$ of formula (I) is vinyl ester of neodecanoic acid or a neononanoic acid, then the $Z^2$ is selected from a cross linker, which is a reactive functional group that reacts with coating-matrix. In some aspects, cross-linker functions as a binder or a hardener. On the other embodiments, if the $Z^2$ of formula (I) is vinyl ester of neodecanoic acid or a neononanoic acid, then the $Z^1$ is selected from a cross linker, which is a reactive functional group that reacts with coating-matrix.

In one embodiment, $R^1$ is selected from —C(O)—O—$R^3$, $(R^3O)_2$—P(O)—O—, $(R^3O)_2$—P(O)—, phosphonates $(R^3$—O$)_2$—P—, —$NR^3$—$CH_2$—COOH, —$NR^3$—$CH_2$—O—$S(O)_2$(OH), —S—$S(O)_2(OR_3)$, —$N(R^3)_2$, —$P(R^3)_2$, an acid addition salt of an amine, salts having quaternary —$N^+R^2_3$ or —$P^+R^2_3$ groups, an alkyl or aryl enamine of the formula (II):

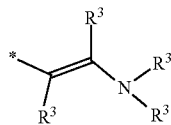
(II)

wherein $R^3$ is hydrogen or an alkyl of from 1 to 8 carbon atoms, and an alkenyl containing from 2 to 8 carbon atoms which is bonded via a single bond or a carbon bond of $L^1$ or $L^2$ to the silicon atom of the respective siloxy unit of the polyorganosiloxane (I).

The cross linker, as used herein, refers to a reactive functional group, which forms a covalent bond with the organic binder, or a hardener present in the coating composition. In some embodiments, the reactive functional group of the cross linker forms a covalent bond with the binder of the coating composition. In some other embodiments, the reactive functional group of the cross linker forms a covalent bond with the hardener of the coating composition. The reactivity will depend on the type of the functional group as well as on the type of binder and/or hardener.

In some embodiments of the coating composition, the $Z^1$ or $Z^2$ is selected from a group consisting of alkoxy, hydroxyalkyl, trialkoxysilyl, isocyanate, acrylate, methacrylate, epoxy, thiolates, hydroxyl, carboxy (—COOH), amino, ketones, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction. In some embodiments, when the $Z^1$ of formula (I) is a vinyl ester of neononanoic acid or neodecanoic acid, the $Z^2$ is selected from a group consisting of alkoxy, hydroxyalkyl, trialkoxysilyl, isocyanate, acrylate, methacrylate, epoxy, thiolates, hydroxyl, carboxy (—COOH), amino, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction. In some other embodiments, when the $Z^2$ of formula (I) is a vinyl ester of neononanoic acid or neodecanoic acid, the $Z^1$ is selected from the group consisting of alkoxy, hydroxyalkyl, trialkoxysilyl, isocyanate, acrylate, methacrylate, epoxy, thiolates, hydroxyl, carboxy (—COOH), amino, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction.

In some other embodiments of the coating composition, the polyorganosiloxane is represented by the general formula (IIA):

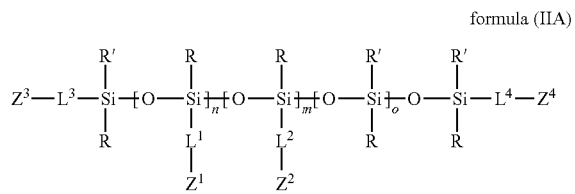
formula (IIA)

wherein $Z^1$, $Z^2$, $Z^3$ and $Z^4$ can be same or different, wherein the subscript n is 0 or an integer of from 1 to 20, the subscript m is 0 or an integer of from 1 to 20, the subscript o is 0 or an integer of from 1 to 20.

In formula (IIA), R, or R' is a saturated hydrocarbon substituent selected from a group consisting of a monovalent alkyl containing from 1 to 22 carbon atoms, optionally substituted by F; an aryl containing from 6 to 22 carbon atoms, a polycyclic aryl containing from 8 to 22 carbon atoms, an alkylaryl containing from 7 to 22 carbon atoms, an arylalkyl group containing from 7 to 22 carbon atoms, and H; or $L^1$-$Z^1$, $L^2$-$Z^2$, $L^3$-$Z^3$, or $L^4$-$Z^4$, and wherein R, and R' can be the same or different.

In formula (IIA), $Z^1$, $Z^2$, $Z^3$ or $Z^4$ of formula (IIA) is a monovalent group selected from the group consisting of R, R', $R^1$, an alkylarylalkyl containing from 8 to 22 carbon atoms, an aryl ether containing from 6 to 22 carbon atoms, a cycloalkyl containing from 6 to 22 carbon atoms, a cycloalkylalkylene containing from 7 to 22 carbon atoms, a bicycloalkyl containing from 7 to 22 carbon atoms, cyclothioalkyl containing from 6 to 12 carbon atoms, an aryl containing 5 to 12 carbon atoms and a hetero atom selected from the group consisting of —N, —O, and —S, an alkyl aldehyde containing from 1 to 20 carbon atoms, and an alkylaryl aldehyde containing from 7 to 20 carbon atoms, each of which groups can optionally be substituted by an alkyl of 1 to 8 carbon atoms, OH, Cl, or Br, and a silyl ether group $R^1_3$Si—O—.

In formula (IIA), $R^1$ is a monovalent unsaturated, unsubstituted or substituted alkenyl or alkynyl group selected from the group consisting of an alkenyl containing from 2 to 22 carbon atoms, a cycloalkenyl containing from 6 to 22 carbon atoms, a bicycloalkenylalkylene containing from 7 to 22 carbon atoms, an acrylate group, a methacrylate group, an alkynyl containing from 2 to 22 carbon atoms, and oxiranyl and carbonate derivatives of the respective $R^1$ groups, and oxiranyl groups containing 3 to 22 carbon atoms, carbonate groups containing from 4 to 23 carbon atoms, Cl, Br, I, —SH, —S—R, —OH, —O—R, —CN, —NCO, and blocked —NCO, $(X)_x(Y)_{3-x}$Si—, $R^6_xR'_{3-x}$Si—, a polyether group, carboxy (—COOH), diacids, diesters, polyester moiety, nitro-alkyl-, cyano-alkyl-, acyl- or alkyl sulfonyl fluoride- groups and, an ionic group derived from an ester of a carboxylic acid, S or P acid, phosphines, an amino group, a primary amine, a secondary amine, a tertiary amine, a keto group, and betaines.

In formula (IIA), wherein $Z^1$, $Z^2$, $Z^3$ and $Z^4$ can be same or different.

In formula (IIA), wherein each $L^1$, $L^2$, $L^3$ and $L^4$ is selected from the group consisting of a single bond, a divalent alkylene group having at least two carbon atoms, optionally interrupted by one or more of —O—, —$NR^3$—C(O)—, and/or —$NR^3$—, —OC(O)$NR^3$—, —$NR^3$—C (O)—$NR^3$— moieties bonded via carbon bond of $L^1$, $L^2$, $L^3$ and $L^4$ to the silicon atom of the respective siloxy unit of the polyorganosiloxane (IIA), and optionally substituted by one or more OH groups, or is a trivalent group, and wherein $L^1$ and $L^2$ can be same or different, and wherein $R^3$ is hydrogen, $Me_3Si$— or an alkyl containing from 1 to 8 carbon atoms, and wherein $L^1$, $L^2$, $L^3$ and $L^4$ can be same or different.

In one or more embodiments, $Z^1$, $Z^2$, $Z^3$ or $Z^4$ of formula (IIA) comprises at least one moiety selected from the group consisting of polyether moieties, ester moieties, and coating-matrix-reactive moieties, such as alkenyl, alkoxy, hydroxyalkyl, alkoxysilyl, trialkoxysilyl, isocyanate, acrylate, methacrylate, epoxy, thiolates, hydroxyl, carboxy (—COOH), amino, ketones, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction.

In some specific embodiments, $Z^1$, $Z^2$ $Z^3$ or $Z^4$ of formula (IIA) includes polyether moieties. The polyether moieties may comprise —$(OCH_2CH_2)_a$—$(OCH_2CH(CH_3))_b$—$(OCH_2CH_2CH(CH_3))_c$—OH, —$(OCH_2CH_2)_a$—$(OCH_2CH(CH_3))_b$—$(OCH_2CH_2CH(CH_3))_c$—O-alkyl of from 1 to 4 carbon atoms, —$(OCH_2CH_2)_a$—$(OCH_2CH(CH_3))_b$—$(OCH_2CH_2CH(CH_3))_c$—O—C(O)-alkyl of from 1 to 4 carbon atoms and —$(OCH_2CH_2)_a$—$(OCH_2CH(CH_3))_b$—$(OCH_2CH_2CH(CH_3))_c$—O—$SiR_3$, with R being an alkyl of from 1 to 8 carbon atoms, a, b, c being 0 to 20 and a+b+c=1 to 20, more preferred are groups represented by the formula —$(OCH_2CH_2)_{3-10}$, —$(OCH_2CH_2)_{3-10}$—OH and —$(OCH_2CH(CH_3))_{3-10}$, —$(OCH_2CH(CH_3))_{3-10}$—OH.

In some embodiments, the $Z^1$, $Z^2$ $Z^3$ or $Z^4$ of formula (IIA) of the coating composition is selected from a vinyl ester of a straight chain or a branched chain carboxylic acid. In one or more embodiments, the $Z^1$, $Z^2$ $Z^3$ or $Z^4$ of formula II is selected from a vinyl ester of a straight chain carboxylic acid. In one or more embodiments, the $Z^1$, $Z^2$ $Z^3$ or $Z^4$ of formula (IIA) of the coating composition is selected from a vinyl ester of a branched chain carboxylic acid.

In one or more embodiments, the $Z^1$, $Z^2$, $Z^3$ or $Z^4$, or both $Z^1$ and $Z^3$ or $Z^2$ and $Z^4$ or $Z^1$ and $Z^4$ or $Z^2$ and $Z^4$ or $Z^3$ and $Z^4$ or $Z^1$ and $Z^2$ or $Z^1$ and $Z^3$ and $Z^4$ of formula (IIA) of the coating composition is selected from a vinyl ester of a neodecanoic acid or a vinyl ester of neononanoic acid. In some embodiments, at least one of the $Z^1$, $Z^2$ $Z^3$ or $Z^4$ of formula (IIA) is a neodecanoic acid or a vinyl ester of neononanoic acid. In some embodiments, the $Z^1$, $Z^2$ $Z^3$ or $Z^4$ of formula (IIA) of the coating composition is selected from a vinyl ester of neononanoic acid containing 9 carbon atoms in the acid moiety an example of which is VeoVa 9™ available from Hexion Inc. In some embodiments, at least one of the $Z^1$, $Z^2$ $Z^3$ or $Z^4$ of formula (IIA) is a VeoVa9. In some other embodiments, the $Z^1$, $Z^2$ $Z^3$ or $Z^4$ of formula (IIA) of the coating composition is selected from a vinyl ester of a neodecanoic acid containing 10 carbon atoms in the acid moiety, which is also known as VeoVa 10™ available from Hexion Inc. In some embodiments, at least one of the $Z^1$, $Z^2$, $Z^3$ or $Z^4$ of formula (IIA) is vinyl ester of neodecanoic acid.

As noted above, in the embodiments of the polyorganosiloxane of formula (IIA), one or more of the $Z^1$, $Z^2$, $Z^3$ or $Z^4$ is selected from a vinyl ester of neodecanoic acid or neononanoic acid, for example, $Z^1$ is selected from vinyl ester of neodecanoic acid. In these embodiments, at least one of the remaining of $Z^1$, $Z^2$, $Z^3$ and $Z^4$ is selected from a cross-linker (coating-matrix-reactive group), for example, $Z^2$ is selected from a cross-linker. In some of these embodiments, the remaining of $Z^1$, $Z^2$, $Z^3$ and $Z^4$ for example, $Z^3$ is further vinyl ester of neodecanoic acid. In such example embodiments, the two groups selected from $Z^1$, $Z^2$, $Z^3$ and $Z^4$ of the polyorganosiloxane of formula (II) represent vinyl ester of neodecanoic acid, and at least one group of $Z^1$, $Z^2$, $Z^3$ and $Z^4$ represents a cross-linker, wherein in one embodiment, $Z^1$ or $Z^2$ may be vinyl ester of neodecanoic acid (pendant position) and $Z^3$ or $Z^4$ may be vinyl ester of neodecanoic acid as well (terminal position). In another embodiment $Z^3$ and $Z^4$ may be vinyl ester of neodecanoic acid (vinyl ester of neodecanoic acid occupies all terminal positions). In yet another embodiment, two groups of $Z^1$, $Z^2$, $Z^3$ and $Z^4$ are a cross-linker and at least one of the remaining groups is vinyl ester of neodecanoic acid. In such embodiments, $Z^1$ or $Z^2$ may be a cross-linker (pendant position) and $Z^3$ or $Z^4$ may be a cross-linker as well (terminal position). In another embodiment $Z^3$ and $Z^4$ may be a cross-linker (cross-linkers occupied all terminal positions).

As mentioned above, in some embodiments, at least one of the $Z^1$, $Z^2$, $Z^3$ or $Z^4$ of formula (IIA) is a vinyl ester of neodecanoic acid, wherein the remaining of $Z^1$, $Z^2$, $Z^3$ or $Z^4$, which are not representing vinyl ester of neodecanoic acid, may be a cross-linker. The cross-linker may be a reactive functional group that reacts with coating-matrix. In such embodiments, if the $Z^1$ or $Z^2$ of formula (IIA) is vinyl ester of neodecanoic acid, then at least one of $Z^3$ and $Z^4$ or both are selected from a cross-linker, which is a reactive functional group functions that reacts with coating-matrix. On the other embodiments, if the $Z^3$ or $Z^4$ or both of formula (IIA) are vinyl ester of neodecanoic acid, then one of $Z^1$ or $Z^2$ or both are selected from a cross-linker, which is a reactive functional group. The cross-linker, as used herein, refers to a reactive functional group, which forms a covalent bond with the organic binder, or a hardener present in the coating composition. In some embodiments, the reactive functional group of the cross-linker forms a covalent bond with the binder of the coating composition. In some other embodiments, the reactive functional group of the cross linker forms a covalent bond with the hardener of the coating composition. The reactivity will depend on the type of the functional group as well as on the type of binder and/or hardener.

In some embodiments of the coating composition, the $Z^1$, $Z^2$, $Z^3$ or $Z^4$ is selected from a group consisting of alkenyl, alkoxy, hydroxyalkyl, alkoxysilyl, trialkoxysilyl, isocyanate, acrylate, methacrylate, epoxy, thiolates, hydroxyl, carboxy (—COOH), amino, ketones, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction. In some embodiments, when at least one but not more than three of the four $Z^1$, $Z^2$, $Z^3$ or $Z^4$ of formula (IIA) is vinyl ester of neodecanoic acid, then at least one of the remaining groups of $Z^1$, $Z^2$, $Z^3$ or $Z^4$ is selected from a group consisting of alkenyl, alkoxy, hydroxyalkyl, alkoxysilyl, trialkoxysilyl, isocyanate, acrylate, methacrylate, epoxy, thiolates, hydroxyl, carboxy (—COOH), amino, ketones, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction. The vinyl ester of neodecanoic acid of such embodiments may be vinyl ester of neononanoic acid or vinyl ester of neodecanoic acid. In some other embodiments, when the $Z^1$ or $Z^2$ or both of formula (IIA) are a vinyl ester of neodecanoic acid or neononanoic acid, the $Z^3$ or $Z^4$ or both are selected from a group consisting of alkenyl, alkoxy, hydroxyalkyl, alkoxysilyl, trialkoxysilyl, isocyanate, acrylate, methacrylate, epoxy, thiolates, hydroxyl, carboxy (—COOH), amino, ketones, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction.

In some embodiments of the coating composition, at least one but not more than three of the $Z^1$, $Z^2$, $Z^3$ or $Z^4$ of formula (IIA) is selected from vinyl ester of neodecanoic acid or neononanoic acid wherein the remaining groups of $Z^1$, $Z^2$, $Z^3$ or $Z^4$ are a trimethoxysilyl group.

In some embodiments of the coating composition, $Z^1$, $Z^3$ and $Z^4$ of formula (IIA) is selected from vinyl ester of neodecanoic acid or neononanoic acid wherein $Z^2$ is a trimethoxysilyl group.

In some embodiments of the coating composition, $Z^1$ and optionally $Z^2$ of formula (IIA) is selected from vinyl ester of neodecanoic acid or neononanoic acid wherein $Z^3$ and $Z^4$ and optionally $Z^2$ is a trimethoxysilyl group.

In some embodiments, the $Z^1$, $Z^2$ $Z^3$ or $Z^4$ of formula (IIA) of the coating composition is selected from polyether moieties such as —(OCH$_2$CH$_2$)$_a$—(OCH$_2$CH(CH$_3$))$_b$—(OCH$_2$CH$_2$CH(CH$_3$))$_c$—OH, —(OCH$_2$CH$_2$)$_a$—(OCH$_2$CH(CH$_3$))$_b$—(OCH$_2$CH$_2$CH(CH$_3$))$_c$—O-alkyl of from 1 to 4 carbon atoms, —(OCH$_2$CH$_2$)$_a$—(OCH$_2$CH(CH$_3$))$_b$—(OCH$_2$CH$_2$CH(CH$_3$))$_c$—O—C(O)-alkyl of from 1 to 4 carbon atoms, and —(OCH$_2$CH$_2$)$_a$—(OCH$_2$CH(CH$_3$))$_b$—(OCH$_2$CH$_2$CH(CH$_3$))$_c$—O—SiR$_3$, where R is an alkyl of from 1 to 8 carbon atoms, a, b, c being 0 to 20 and a+b+c=1 to 20. In one or more embodiments, the $Z^1$, $Z^2$ $Z^3$ or $Z^4$ of formula (IIA) of the coating composition is selected from groups represented by the formula —(OCH$_2$CH$_2$)$_{3-10}$, —(OCH$_2$CH$_2$)$_{10}$—OSi(CH$_3$)$_{3-10}$, —(OCH$_2$CH$_2$)$_{3-10}$—OH, —(OCH$_2$CH(CH$_3$))$_{3-10}$, and —(OCH$_2$CH(CH$_3$))$_{3-10}$—OH.

In one or more embodiments, the $Z^1$, $Z^2$ $Z^3$ or $Z^4$, or both $Z^1$ and $Z^3$ or $Z^2$ and $Z^4$ or $Z^1$ and $Z^4$ or $Z^2$ and $Z^4$ of formula (IIA) of the coating composition is selected from a polyether group. In some embodiments, at least one of the $Z^1$, $Z^2$ $Z^3$ or $Z^4$ of formula (IIA) is a polyether. In some embodiments, the $Z^1$, $Z^2$ $Z^3$ or $Z^4$ of formula (IIA) of the coating composition is selected from a polyether represented by the formula —(OCH$_2$CH$_2$)$_{7.5}$—OCH$_3$. In some embodiments, at least one of the $Z^1$, $Z^2$ $Z^3$ or $Z^4$ of formula (IIA) is a polyether represented by the formula —(OCH$_2$CH$_2$)$_{3-10}$—OSi(CH$_3$)$_3$ or —(OCH$_2$CH$_2$)$_{3-10}$—OH.

As noted above, in the embodiments of the polyorganosiloxane of formula (IIA), one or more of the $Z^1$, $Z^2$, $Z^3$ or $Z^4$ is selected from a polyether, for example, $Z^1$ is selected from a polyether. In these embodiments, at least one of the remaining of $Z^1$, $Z^2$, $Z^3$ and $Z^4$ is selected from a cross-linker, for example, $Z^2$ is selected from a cross-linker. In some of these embodiments, the remaining of $Z^1$, $Z^2$, $Z^3$ and $Z^4$ for example, $Z^3$ is another polyether. In such example embodiments, the two groups selected from $Z^1$, $Z^2$, $Z^3$ and $Z^4$ of the polyorganosiloxane of formula (IIA) represent the polyether, and at least one group of $Z^1$, $Z^2$, $Z^3$ and $Z^4$ represents a cross-linker, wherein in one embodiment, $Z^3$ or $Z^4$ may be a polyether (terminal position) and $Z^1$ or $Z^2$ may be a polyether as well (pendant position). In another embodiment $Z^3$ and $Z^4$ may be a polyether (the polyether occupies all terminal positions). In yet another embodiment, two groups of $Z^1$, $Z^2$, $Z^3$ and $Z^4$ are a cross-linker and at least one of the remaining groups is a polyether, wherein in one embodiment, $Z^3$ or $Z^4$ may be a cross-linker (pendant position) and $Z^1$ or $Z^2$ may be a cross-linker as well (terminal position). In another embodiment $Z^3$ and $Z^4$ may be a cross-linker (cross-linkers occupy all terminal positions).

As mentioned above, in some embodiments, at least one of the $Z^1$, $Z^2$, $Z^3$ or $Z^4$ of formula II is a polyether, wherein the remaining of $Z^1$, $Z^2$, $Z^3$ or $Z^4$, which are not representing a polyether, may be a cross-linker. The cross-linker may be a reactive functional group that reacts with the coating-matrix. In one or more embodiments, the reactive functional group of the cross-linker functions as a binder or as a hardener. In such embodiments, if the $Z^1$ or $Z^2$ of formula II is a polyether, then at least one of $Z^3$ and $Z^4$ or both are selected from a cross-linker, which is a reactive functional group that reacts with the coating-matrix. On the other embodiments, if the $Z^3$ or $Z^4$ or both of formula II are a polyether, then one of $Z^1$ or $Z^2$ or both are selected from a cross-linker, which is a reactive functional group that reacts with the coating-matrix. The cross-linker, as used herein, refers to a reactive functional group, which forms a covalent bond with the organic binder, or a hardener present in the coating composition. In some embodiments, the reactive functional group of the cross-linker forms a covalent bond with the binder of the coating composition. In some other embodiments, the reactive functional group of the cross linker forms a covalent bond with the hardener of the coating composition. The reactivity will depend on the type of the functional group as well as on the type of binder and/or hardener.

In some embodiments of the coating composition, the $Z^1$, $Z^2$, $Z^3$ or $Z^4$ is selected from a group consisting of alkenyl, alkoxy, hydroxyalkyl, alkoxysilyl, trialkoxysilyl, isocyanate, acrylate, methacrylate, epoxy, thiolates, hydroxyl, carboxy (—COOH), amino, ketones, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction. In some embodiments, when at least one but not more than three of the four $Z^1$, $Z^2$, $Z^3$ or $Z^4$ of formula II is a polyether, then at least one of the remaining groups of $Z^1$, $Z^2$, $Z^3$ or $Z^4$ is selected from a group consisting of alkenyl, alkoxy, hydroxyalkyl, alkoxysilyl, trialkoxysilyl, isocyanate, acrylate, methacrylate, epoxy, thiolates, hydroxyl, carboxy (—COOH), amino, ketones, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction. The polyether of such embodiments may be represented by the formulas —(OCH$_2$CH$_2$)$_{7.5}$—OCH$_3$ or —(OCH$_2$CH$_2$)$_{10}$—OSi(CH$_3$)$_3$ or —(OCH$_2$CH$_2$)$_{10}$—OH. In some other embodiments, when the $Z^1$ or $Z^2$ or both of formula (IIA) are a polyether, the $Z^3$ or $Z^4$ or both are selected from a group consisting of alkenyl, alkoxy, hydroxyalkyl, alkoxysilyl, trialkoxysilyl, isocyanate, acrylate, methacrylate, epoxy, thiolates, hydroxyl, carboxy (—COOH), amino, ketones, diketones, 1,3-diketones, diacids, 1,3-diacids, diesters, 1,3-diesters, nitro-alkyl-, cyano-alkyl-, acyl- or alkyl sulfonyl fluoride- groups as well as donor and acceptor groups in the Michael addition reaction.

In some embodiments of the coating composition, at the most three groups of the $Z^1$, $Z^2$, $Z^3$ or $Z^4$ of formula (IIA) is selected from a polyether as represented by the formulas —(OCH$_2$CH$_2$)$_{7.5}$—OCH$_3$ or —(OCH$_2$CH$_2$)$_{10}$—OSi(CH$_3$)$_3$ or —(OCH$_2$CH$_2$)$_{10}$—OSi(CH$_3$)$_3$ wherein the remaining groups of $Z^1$, $Z^2$, $Z^3$ or $Z^4$ are a 1,3-diester as represented by the formula —O(CO)CH$_2$(COOCH$_3$).

In some embodiments of the coating composition, $Z^1$, $Z^3$ and $Z^4$ of formula (IIA) is selected from a group of polyethers as represented by the formulas —(OCH$_2$CH$_2$)$_{7.5}$—OCH$_3$ and —(OCH$_2$CH$_2$)$_{10}$—OSi(CH$_3$)$_3$ wherein $Z^2$ is a 1,3-diester as represented by the formula —O(CO)CH$_2$(COOCH$_3$).

In some embodiments of the coating composition, $Z^1$ and optionally $Z^2$ of formula (IIA) is selected from a polyether as represented by the formulas —(OCH$_2$CH$_2$)$_{7.5}$—OCH$_3$ and —(OCH$_2$CH$_2$)$_{10}$—OSi(CH$_3$)$_3$ wherein $Z^3$ and $Z^4$ and optionally $Z^2$ is a 1,3-diester as represented by the formula —O(CO)CH$_2$(COOCH$_3$).

In some embodiments, the polyorganosiloxane is chosen so that the end product, which is a silicone-based coating, has silicone in a weight average molecular weight in the range of from about 100 to about 10,000, from about 600 to about 10,000, from about 800 to about 5,000. In some embodiments, the polyorganosiloxane is chosen so that the viscosity of silicone in the silicone-based coating is from about 2 cps to about 2,500 cps, preferably from about 2 cps to about 1,800 cps, more preferably from about 5 cps to about 1,700 cps and most preferably from about 10 cps to about 1,600 cps. As described herein, viscosities are measured at 25° C. with a rotary viscosimeter at a shear rate of 10 s$^{-1}$.

In certain embodiments, the previously described polyorganosiloxane, selected from the group of compounds of formula (I) or (IIA), is present in the coating compositions in an amount ranging from about 0.01 to about 30 percent by weight, such as about 0.02 to about 20 percent by weight, or, in some cases, about 0.05 to about 15 percent by weight, with the weight percent being based on the total weight of the coating/coating composition.

The organic binder of the coating composition described herein can be one or more organic binders, preferably a polymeric organic binder. In the broadest aspect, it is contemplated that any polymeric binder may be employed. The binder imparts properties such as gloss, durability, flexibility, and toughness. The organic binder (a) can be an organic binder selected from the group consisting of acrylic resins, hydroxy acrylate resins, vinyl-acrylic resins, vinyl acetate/ethylene (VAE), alkyd resins, polyurethane (urethane resins), epoxy resins, latex, asphaltic, polyester, melamine-formaldehyde, phenol formaldehyde, polyamide, isocyanate, synthetic or natural resins such as alkyds, melamine resin such as melamine alkyd, and combinations thereof. A preferable acrylic binder is formed from monoethylenically unsaturated acid free monomers comprising $C_1$-$C_4$ alkyl esters of acrylic or methacrylic acids such as methyl acrylate, ethyl acrylate, butyl acrylate, methyl methacrylate, ethyl methacrylate, butyl methacrylate, isobutyl methacrylate, ethyl hexylacrylate; hydroxyalkyl esters of acrylic or methacrylic acids such as hydroxyethyl acrylate, hydroxypropyl acrylate, hydroxyethyl methacrylate and hydroxypropyl methacrylate; acrylamides and alkyl-substituted acrylamides including acrylamide, methacrylamide, N-tertiarybutylacrylamide, N-methacrylamide and N,N-dimethacrylamide, dimethylaminoethyl acrylate, dimethylaminoethyl methacrylate; acrylonitrile and methacrylonitrile. The monoethylenically-unsaturated acid free monomer may include the vinyl monomer styrene so as to form a copolymer or may be formed solely from styrene.

Examples of acid free monomers of organic binder include butyl acrylate, methyl methacrylate, ethyl hexylacrylate, styrene, vinyl toluene, acrylonitrile, vinyl acetate, acrylic acid, vinyl ester of neodecanoic acid or neononanoic acid, silane-containing monomer, and combinations thereof.

In some embodiments, the organic binder is an organic solvent-based epoxy resin, e.g. phenol-formaldehyde epoxy resin. The phenol-formaldehyde epoxy resin can further react with a hardener component, such as a polyamine or react with itself by ring-opening polymerization.

In one or more embodiments, the coating system is a solvent-based system, wherein the organic binder can also be an alkyd resin which may be complex branched and cross-linked polyesters having unsaturated aliphatic acid residues. The organic binder can also be a polyurethane binder, wherein such urethane resin binders typically comprise the reaction product of a polyisocyanate, and a polyol. In one embodiment, the organic binder can be a polyol-based acrylate, such as a hydroxyacrylate or hydroxymethacrylate polymer or oligomer. The free hydroxyl groups are further reacted with a crosslinker/hardener containing two or more isocyanate groups. The crosslinker/hardener can be a polymer or oligomer or monomer containing free isocyanate groups to form a polyurethane polymer. The hydroxyacrylate or hydroxymethacrylate pre-polymer or -oligomer can be derived from homo- or co-polymerization of hydroxyalkyl acrylates and methacrylates including 2-hydroxyethyl acrylate, 2-hydroxyethyl methacrylate and their corresponding alkyl derivatives such as propyl and butyl derivatives. Also included are monomethacrylate and monoacrylates of diethylene glycol, glycerol, trimethylol propane and pentaerythritol. Further examples include di- and tri-acrylates and methacrylates of the above-mentioned glycols provided that at least one free hydroxy group remains for reactions with functional isocyanate groups. Further hydroxy acrylates include N-hydroxymethyl methacrylamide and N-hydroxymethyl acryl amide. Furthermore the hydroxyacrylate or hydroxymethacrylate pre-polymer or -oligomer can be a copolymer obtained by reaction of hydroxyacrylates or hydroxymethacrylates with mono-, di, tri or oligo-ethylenically unsaturated acid-free monomers such as monomers comprising $C_1$-$C_4$ alkyl esters of acrylic or methacrylic acids such as methyl acrylate, ethyl acrylate, butyl acrylate, methyl methacrylate, ethyl methacrylate, butyl methacrylate, isobutyl methacrylate, ethyl hexylacrylate; hydroxyalkyl esters of acrylic or methacrylic acids such as hydroxyethyl acrylate, hydroxypropyl acrylate, hydroxyethyl methacrylate and hydroxypropyl methacrylate; acrylamides and alkyl-substituted acrylamides including acrylamide, methacrylamide, N-tertiarybutylacrylamide, N-methacrylamide and N,N-dimethacrylamide, dimethylaminoethyl acrylate, dimethylaminoethyl methacrylate, acrylonitrile and methacrylonitrile. The monoethylenically unsaturated acid free monomer may include the vinyl monomer styrene.

In one embodiment, the polyol used for the formation of the binder polyurethane can be selected from the group of polyoxyalkylenes such as polyoxyethylene and polyoxypropylene and co-polymers thereof. Further examples include hydroxyl functional polyesters or aliphatic or aromatic diols or -polyols.

The organic binder can be present in the coating composition in an amount from about 5 wt. % to about 99 wt. %, preferably about 7 wt. % to about 95 wt. %, and more preferably about 10 wt. % to about 90 wt. % and even more preferably about 15 w % to about 80 wt. % with the weight percent being based on the total weight of the coating composition.

In one or more embodiments, the coating composition further comprises one or more hardener. In such embodiments, the binder may need to be combined with a hardener to enable film formation. The term "hardener" as used herein refers to reactive compounds having two or more functional groups. The functional groups crosslink with the binder but are not limited to the reaction with the binder. In some embodiments, the functional groups can also react with the other auxiliary components of the composition, for example, fillers, or additives. In some other embodiments, the functional groups can self-polymerized to form an oligomer. The main purpose of the hardener is, but is not limited to, crosslinking with the binder to cure the coating. In one embodiment, the hardener can be selected from the group of polyamines including aromatic or aliphatic diamines or oligo-amines such as 1,2-diaminocyclohexane, 4,4'-diaminodiphenylsulfon 1,5-diamino-2-methylpentane, diethylenetriamine, hexamethylenediamine, isophorone diamine, triethylenetetramine.

In one embodiment, the crosslinker/hardener can be a polyisocyanate having free isocyanate groups which can react with polyols contained in the coating formulation to form a polyurethane compound to help for binding the coating. In another embodiment, the hardener such as aromatic, aliphatic and cycloaliphatic diisocyanates or polyisocyanates and mixtures of two or more can react with water, polyols or polyamines to crosslink the binder such as polyurethane or polyurea or biuret oligomer or polymer or combinations thereof.

Examples for di- or polyisocyanate hardeners include toluene-2,4-diisocyanate, m-phenylene diisocyanate, 1,5-naphthylene diisocyanate, 1,4-tetramethylene diisocyanate, 1,6-hexamethylene diisocyanate, 1,10 decamethylene diisocyanate, 1,4-cyclo-hexylene diisocyanate, 4,4' methylene-bis(cyclohexyl isocyanate), 1,5-tetrahydronaphthylene diisocyanate and 1,4-xylylene diisocyanate, or isophorone diisocyanate.

The coating composition described herein can further comprise one or more auxiliary components selected from the group consisting of filler or pigment, water, solvent. Besides the three main categories of ingredients, coating can have a wide variety of miscellaneous additives, which are usually added in small amounts, yet provide a significant effect on the product or its application or handling. Some examples include additives like surfactants to modify surface tension, dispersants, defoamers to control foaming, coalescents, opaque polymers, colorants, anti-static agents, flow improvers, an agent to improve the finished appearance, an agent to increase wet edge, pigment stability improver, an agent to impart antifreeze properties, an agent to control skinning, catalysts, thickeners, stabilizers, emulsifiers, texturizers, adhesion promoters, UV stabilizers, flatteners (de-glossing agents), biocides to fight bacterial growth, silicone-based adhesion promoters, and the like and combinations thereof.

In one embodiment, the coating composition may comprise fillers, wherein the fillers may include granular solids. The fillers are generally incorporated to impart toughness, texture, or to give the coating special properties and/or to reduce the cost of the coating. In some embodiments, the fillers can be selected from the group consisting of titanium dioxide, clays, nano-clay, organo-clay, ground calcium carbonate, precipitated calcium carbonate, colloidal calcium carbonate, calcium carbonate treated with compounds containing a stearate moiety or stearic acid, fumed silica, precipitated silica, crushed quartz, ground quartz, finely ground quartz, alumina, aluminum hydroxide, ceramic and glass spheres, titanium hydroxide, kaolin, bentonite, montmorillonite, diatomaceous earth, iron oxide, carbon black, graphite, talc, mica, pumice, wollastonite, dolomite, feldspar, colored pigment, and combinations thereof.

In another embodiment, the coating composition comprises one or more solvent. The solvent may be selected from the group consisting of alcohols, glycols, ketones, esters, ethers, carbonates, aliphatics, cycloaliphatics, aromatics, hetero aromatics, hetero aliphatics, hetero cycloaliphatics, amides, sulfoxides, water, and combinations thereof. In some embodiments, the solvent can be mineral spirit, acetone, turpentine, naphtha, toluene, methyl ethyl ketone, dimethylformamide, 2-butoxyethanol, glycol ether, ethylbenzene, xylene, n-Butyl acetate, butanol, pyridine, dimethyl carbonate, dimethylsulfoxide, and combinations thereof.

In one embodiment, the coating composition comprises an additive such as an organic surfactant to modify the surface tension of the coating, for example, a surfactant used in a dispersion comprising the coating composition described herein. Surfactants are also used to stabilize the dispersion of polymer particles during emulsion polymerization in coatings and other applications. The mechanical stability, freeze-thaw stability and shelf-life of coatings are all improved by the addition of surfactants. The addition of surfactants to coating also allows the coating to coat a surface more easily because surfactants increase the wetting of a solution. The surfactant can be any one or more of an anionic, cationic, non-ionic, or amphoteric surfactant. In one specific embodiment, the surfactant is a nonionic surfactant. In the context of the present invention, anionic surfactants may optionally be used. By way of example, mention may be made of surfactants such as the alkali metal salts of sulfonic or alkylsulfuric aromatic hydrocarbon-based acids and the preferred nonionic surfactants are polyoxyethylenated alkylphenols or polyoxyethylenated fatty alcohols. The amount of surfactant that can be used is that commonly employed for emulsification. The nonionic (preferably), ionic or amphoteric surfactants may be employed alone or mixed together. In practice, the dispersion according to the invention comprises from about 30 to about 90%, preferably from about 30 to about 60% by weight of water per about 70 to about 10%, preferably about 70 to about 40%, by weight of non-aqueous phase.

The coating composition may further comprise a dispersant. The dispersant employed herein may include phosphates and/or polyacrylics.

The coalescent that may be employed herein can be chosen, preferably, from glycols and/or aliphatic petroleum cuts.

The thickener herein may be chosen, preferably, from acrylic cellulose thickeners, polyurethanes, natural gums and mixtures thereof.

In certain embodiments, the coating compositions of the present invention comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coating compositions by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type, benzimidazolone, condensation, metal complex, iso-indolinone, iso-indoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect.

In one or more embodiments, the coating composition herein can be in used in any coating, varnish, lacquer, shellac or stain. In one embodiment, the coating composition is used in a paint, in a specific embodiment, an organic paint.

In one embodiment herein, the coating composition has properties which are synergistic as compared to a composition wherein a polyorganosiloxane additive is employed in combination with an organic binder. In a more specific embodiment, the coating composition herein has a surface contact angle of water of from about 5 to about 80, from about 40 to about 80, alternatively from about 80 to about 120 or alternatively from about 120 to about 180.

In one or more embodiments, the coating composition demonstrates properties including, but is not limited to, hydrophobicity, low surface energy, durability, anti-graffiti, stain resistance/easy clean, and resistance to water, UV-irradiation, chemicals, temperature, or microbes. In some embodiments, the coating composition is resistant against graffiti, may be called as an anti-graffiti coating. In some embodiments, the coating composition may be a non-sacrificial coating.

In some embodiments, the coating composition forms a paint.

In one embodiment, any of the aforementioned coating compositions can be applied to a substrate, including such nonlimiting examples as metals (including bare or pre-coated metal), plastics, wood, concrete, glass, paper, cement, clay, rocks, stones, fabric, ceramic, synthetic foam, gypsum, plaster of Paris, putty, stucco, or composites. In some aspects, an additional primer can be coated onto the substrate before applying the coating.

In one embodiment, the coating on the substrate can have a thickness of about 1-1000 μm. The final coating composition, whether freshly prepared or after storage, may be applied, for example, to facades, by various techniques, such as immersion techniques, including dip drain and dip spin procedures, by curtain coating, brush coating or roller coating and included combinations of the foregoing. It is also contemplated to use spray technique as well as combinations, e.g., spray and spin and spray and brush techniques. Coated articles that are at an elevated temperature may be coated, with the coating composition described herein. Possible treatments may include primers, pre-coats, and/or overcoats. Primer is a preparatory coating put on materials before applying the coating or paint itself. The primed surface ensures better adhesion of the coating or paint, thereby increasing the durability of the coating and providing improved protection for the painted surface. Suitable primers also may block and seal stains or hide a color that is to be painted over.

In some embodiments, a primer is used before coating a substrate, wherein the primer is completely or partially cured. Before coating a substrate, it can be needed to apply a pre-coat to prepare the surface and help the coating adhere correctly. In such embodiments, the desired coating can be achieved by simply applying a primer and let it completely or partially dry before adding the desired coating for final finish. For a most even finish possible, a primer and a sealer may be selected for the pre-coat. This kind of pre-coat can hide any color on the new drywall and produce a homogeneous finish for the final coat.

In yet another embodiment, a process of making a coating composition is provided. The process comprises, combining: (i) an organic binder; and (ii) a polyorganosiloxane of formula (I) and/or (IIA), wherein the organic binder (i) and the polyorganosiloxane of formulae (I) and (IIA) are described herein. In some embodiments, the process further comprises adding a hardener.

It will be understood herein that the term "combination" as it relates to the expression "combination of (i) an organic binder, and (ii) a polyorganosiloxane of formula (I) and/or (IIA) is nonlimiting as regards the composition of, or the making of the combination, i.e., the components (i) and (ii) may be present/mixed together prior to, during or after the addition of the hardener, or alternatively, one of the components (i) and (ii) may be added separately to the hardener, followed by subsequent addition of the other component thereto.

EXAMPLES

The vinyl ester of neodecanoic acid is referred to herein as VeoVa™ 10 (from Hexion Inc.) and vinyl ester of neononanoic acid is referred to herein as VeoVa™ 9 (from Hexion Inc.). VeoVa™ 10-based hydrolyzable PDMS was used in this study with general formulae (III), (IV), (V) and (VI) made as described herein below. The polyorganosiloxanes of formula (III), (IV), (V) and (VI) were synthesized and characterized for further study. In the polyorganosiloxane of formula (III), (IV), (V) and (VI), $R^1$ and $R^2$ designate to alkyl-substituted VeoVa™ (from Hexion Inc.).

Example 1 Synthesis of a Trimethoxy Functionalized Siloxane 100.0 g of Si—H terminated polydimethylsiloxane ($M^H$-$D_{11}$-$M^H$) with an average D-unit chain length of 11 and 175 ppm of Wilkinson's catalyst (Tris-triphenyl-rhodium chloride) were mixed in xylene and was heated to 80° C. Vinyltrimehtoxysilane (16.0 g) was added dropwise to the above mixture and then was vigorously stirred at 80° C. for 9 hrs to form Si—H terminal trimethoxy functionalized polydimethylsiloxane. The excess of Si—H terminated polydimethylsiloxane ($M^H$-$D_{11}$-$M^H$) was removed in vacuo (130° C., <1 mbar) yielding in 113.0 g of an intermediate product, which was further used in a subsequent reaction step without further characterization.

Example 2 Synthesis of a VeoVa10™ and Trimethoxysilyl Functionalized Siloxane VeoVa10™ [Hexion] (40.0 g) was added dropwise at 80° C. to a vigorously stirred mixture of a Si—H terminal trimethoxy functionalized polydimethylsiloxane as obtained by example 1 (above) to form a mixture. Lamoreaux-Pt catalyst (10 ppm, as 3.3 wt. % Pt solution in octanol) was further added to the above mixture (of VeoVa10™ and Si—H terminal trimethoxy functionalized polydimethylsiloxane) under an $N_2$ atmosphere and the Pt catalyst added mixture was kept at 80° C. for 5 hrs. Subsequently, volatile components were removed in vacuo (65° C., <1 mbar). The neat product of an acid ester of trimethoxy functionalized siloxane (structure III) was obtained as a brownish fluid (139.0 g, 97.0% yield related to the amount of used starting materials).

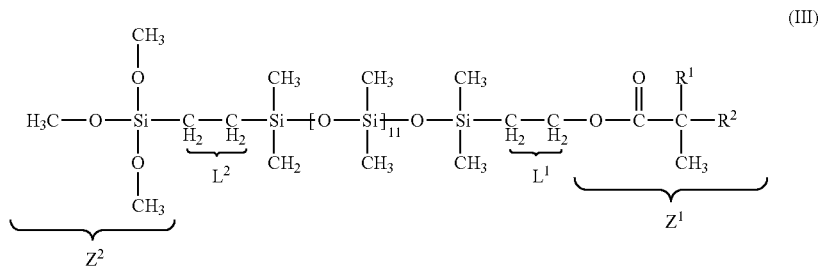

(III)

Example 3 Synthesis of Polyether and Malonate Functionalized PDMS (IV)

24.6 g of an allyl/methyl terminated polyether with an average ethylene oxide chain length of 7,5 was added dropwise at 80° C. to a vigorously stirred mixture of 9.4 mmol Si—H terminal polydimethylsiloxane ($M^H D_5 D^H{}_6 M^H$) in xylene. Lamoreaux-Pt catalyst (30 ppm, as 3.3 wt. % Pt solution in octanol) was further added to the above mixture under an $N_2$ atmosphere and the mixture was kept at 80° C. for 5 hrs, yielding an intermediate product, which was further used in a subsequent reaction step without further characterization. The intermediate product, 2.1 g of allyl glycidyl ether and a solution of Lamoreaux-Pt catalyst (10 ppm, as 3.3 wt. % Pt solution in octanol) was heated at 80° C. under an $N_2$ atmosphere for 17 hrs. 2.1 g of triethylamine and is added as well as 2.1 g methyl hydrogen malonate and the mixture were stirred at 120° C. for 5 hrs. Subsequently, volatile components were removed in vacuo (100° C., <5 mbar).

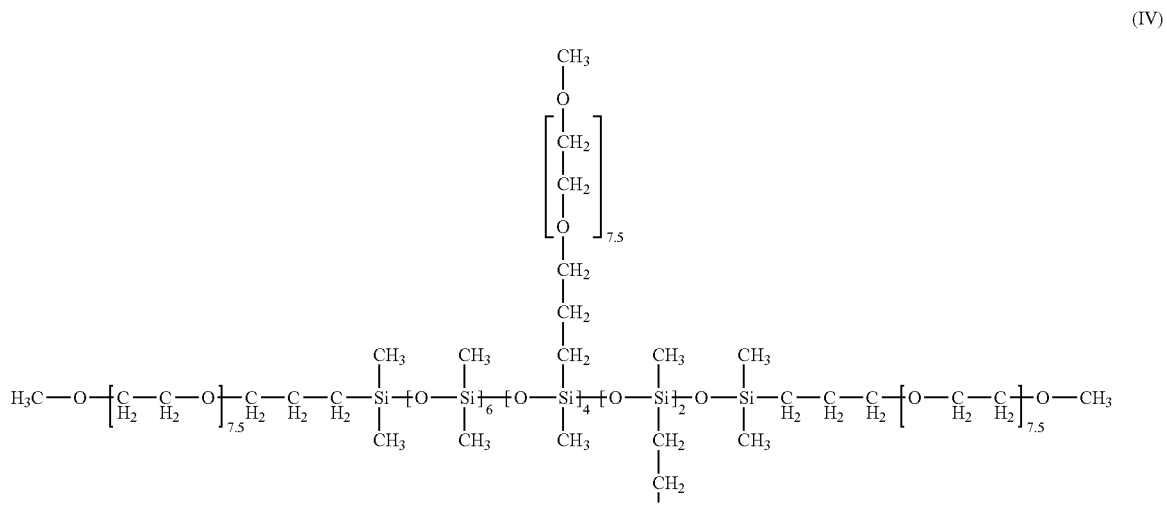

(IV)

-continued

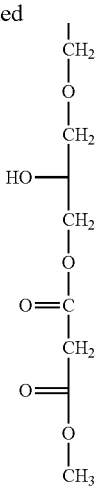

Prophetic Example 4: Synthesis of Vinyl Ester of Neodecanoic Acid and Hydroxy Functionalized PDMS (V)

VeoVa10™ [Hexion] is added dropwise at 80° C. to a vigorously stirred mixture of a Si—H terminal polydimethylsiloxane with an average D-unit chain length of 12 in xylene. Lamoreaux-Pt catalyst (3.3 wt. % Pt solution in octanol) is further added to the above mixture under an $N_2$ atmosphere and the mixture is kept at 80° C. The excess of Si—H terminated polydimethylsiloxane ($M^H$-$D_{12}$-$M^H$) is removed in vacuo (130° C., <1 mbar) yielding in intermediate product, which was further used in a subsequent reaction step without further characterization. The intermediate product, Allyl glycidyl ether and a solution of Lamoreaux-Pt catalyst (3.3 wt. % Pt solution in octanol) is heated at 100° C. under an $N_2$ atmosphere. After complete Si—H conversion, Triethylamine is added as well as VeoVa 10™ [Hexion] and the mixture is stirred at 120° C. for 5 hrs. Subsequently, volatile components are removed in vacuo (100° C., <1 mbar).

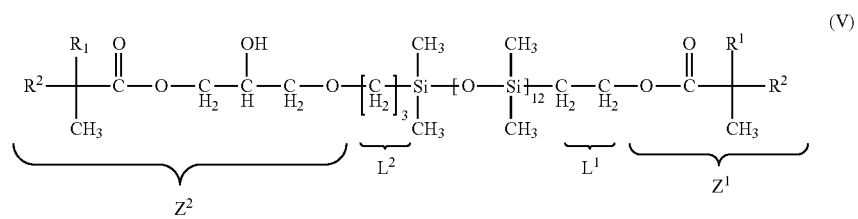

(V)

Prophetic Example 5 Synthesis of VeoVa™ and Hydroxy Functionalized PDMS (VI)

10 mmol Allyl Glycidyl ether is added dropwise at 80° C. to a vigorously stirred mixture of 10 mmol Si—H terminal polydimethylsiloxane ($M^H D_6 D^H_6 M^H$) in xylene. Lamoreaux-Pt catalyst (3.3 wt. % Pt solution in octanol) is further added to the above mixture under an $N_2$ atmosphere and the mixture is kept at 80° C., yielding in intermediate product, which is further used in a subsequent reaction step without further characterization. The intermediate product, 70 mmol VeoVa10 [Hexion] and a solution of Lamoreaux-Pt catalyst (3.3 wt. % Pt solution in octanol) is heated at 120° C. under an $N_2$ atmosphere. After complete Si—H conversion, Triethylamine is added as well as 10 mmol VeoVa10™ [Hexion] and the mixture is stirred at 120° C. for 5 hrs. Subsequently, volatile components are removed in vacuo (100° C., <1 mbar).

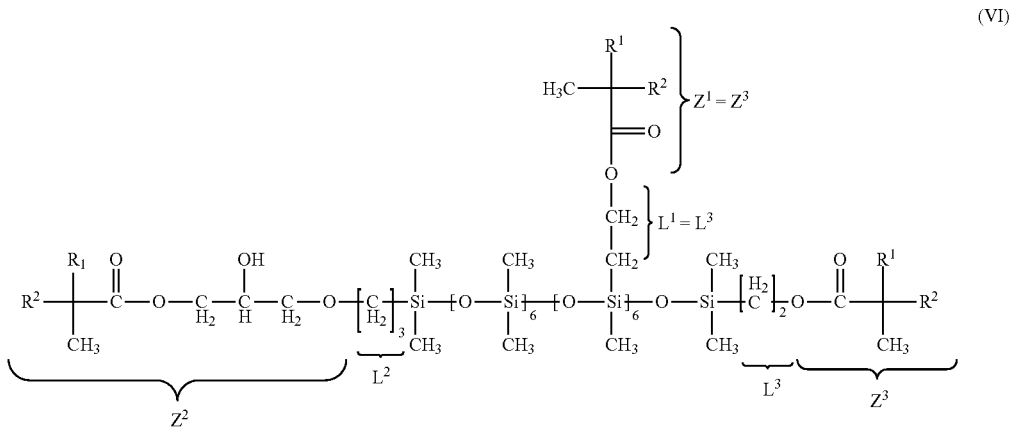

(VI)

Prophetic Example 6 Synthesis of VeoVa™ and Trimethoxysilyl Functionalised PDMS (VII)

60 mmol VeoVa10™ [Hexion] is added dropwise at 80° C. to a vigorously stirred mixture of a 10 mmol Si—H terminal polydimethylsiloxane ($M^H D_6 D^H_6 M^H$) in xylene. Lamoreaux-Pt catalyst (3.3 wt. % Pt solution in octanol) is further added to the above mixture under an $N_2$ atmosphere and the mixture is kept at 120° C., yielding in intermediate product, which is further used in a subsequent reaction step without further characterization. The intermediate product, 20 mmol vinyltrimethoxy silane and a solution of Lamoreaux-Pt catalyst (3.3 wt. % Pt solution in octanol) is heated at 100° C. under an $N_2$ atmosphere.

A polyurethane based clear coating (A 2K colorless glossy clear coating) was obtained from one of the Industry benchmarks (benchmark I) and used as a base formulation as a control sample for reference. As a commercial reference for anti-graffiti coatings, a 2K PUR anti-graffiti coating obtained from another standard Industry benchmark (benchmark II) was used.

Preparation of Control sample: Formulation 1 was prepared by mixing 3 g of benchmark I sample and 1 g of Desmodur N75 (hardener I) by hand and coated onto a metal plate. The coating was dried for seven days at room temperature. The benchmark I sample was used herein as a hydroxyacrylate binder.

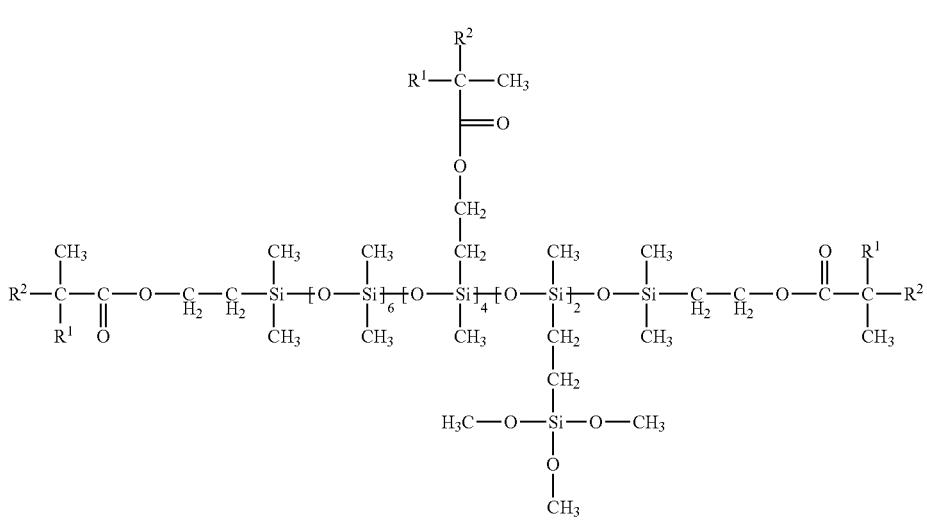

(VII)

Example 7: Test for Anti-Graffiti

Anti-graffiti performance refers to the ease of removing graffiti by hand with a wooden spatula without damaging the substrate. Two ratings were given. Rating 1 (high) corresponds to the higher degree of easiness of removing the graffiti (very low force from the hand needed) and rating 2 (low) means that it was difficult and/or not possible to remove the graffiti (high force needed from the hand).

Preparation of test sample: Formulation 2 was prepared by mixing 3 g of benchmark I sample, 1 g of Desmodur N75 (hardener) and 0.4 g of the hydrolysable polysiloxane (13 D units) terminated with a VeoVa silane, as described in the specification, by hand and coated onto a metal plate. The coating was dried for three days at room temperature followed by two days at 60° C. Desmodur N75, as used herein as a hardener component for polyurethane coating systems, is an aliphatic polyisocyanate, HDI biuret.

Preparation of Control sample: Formulation 3 was prepared by mixing 5 g of the benchmark II sample (two-component polyurethane paint with additive giving non-stick properties for subsequent graffiti removability) and 1 g of a standard commercially available hardener (hardener II) were mixed by hand and coated onto a metal plate. The commercially available hardener used for this example was compatible to the benchmark II sample. The coating was dried for seven days at room temperature.

Anti-graffiti test: A commercial acrylic resin spray was applied onto the coated surfaces. The commercial solvent-based acrylic spray-paint in red color from E-Coll was applied to the coated surfaces as graffiti. The paint was dried for at least one day. Then the adhesive tape referring to Tesa tape 7475 was applied and pressed onto the dried paint by rolling five times over the tape with a brayer and a weight of 2300 g to determine anti-graffiti properties. After one day, the adhesive tape was removed, and the anti-graffiti performance was assessed. A passed cycle refers to the complete removal of the graffiti paint.

The use of the hydrolysable polysiloxane (13 D units) terminated with a VeoVa silane in a two-component polyurethane glossy clear coating showed a superior effect over a commercially available two-component polyurethane abased anti-graffiti coating. Example Formulation 2 showed that a graffiti could be removed more than 4 times, the best performance from all formulations.

TABLE 1

Anti-graffiti test results for different coating compositions:

| Example Formulation No. | Base | Additive | Number of cycles passed |
|---|---|---|---|
| 1 | Benchmark sample I (glossy clear coating) + hardener I | — | 0 |
| 2 | Benchmark sample I (glossy clear coating) + hardener I | hydrolysable polysiloxane (13 D units) terminated with a VeoVa silane according to the Example 2 | >4 |
| 3 | Benchmark sample II (two-component polyurethane anti-graffiti paint with additive) + hardener II | | 2 |

While the invention has been described with reference to certain embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A coating composition, comprising:
(i) an organic binder; and
(ii) a polyorganosiloxane of formula (I):

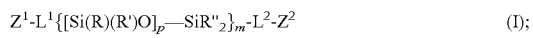

(I);

wherein the subscript p>9, wherein the subscript m is an integer of from 1 to 5, wherein each R, R' or R" is selected from the group consisting of a saturated hydrocarbon substituent selected from the group consisting of a monovalent alkyl containing from 1 to 22 carbon atoms, optionally substituted by F or a —OH group, an aryl containing from 6 to 22 carbon atoms, a polycyclic aryl containing from 8 to 22 carbon atoms, an alkylaryl containing from 7 to 23 carbon atoms, and an arylalkyl containing from 7 to 22 carbon atoms, and H, or $L^1$-$Z^1$ or $L^2$-$Z^2$, and wherein each R, R' and R" can be same or different;

wherein, each $L^1$ or $L^2$ is selected from the group consisting of a single bond, a divalent alkylene group having at least two carbon atoms, and a trivalent group; optionally the two carbon atoms of the divalent alkylene group is interrupted by one or more of —O—, —$NR^3$—C(O)—, —$NR^3$—, —OC(O)$NR^3$—, and/or —$NR^3$—C(O)—$NR^3$— moieties bonded via carbon bond of $L^1$ or $L^2$ to the silicon atom of the respective siloxy unit of the polyorganosiloxane (I) and wherein $R^3$ is hydrogen, $Me_3Si$— or an alkyl containing from 1 to 8 carbon atoms, optionally the divalent alkylene group is substituted by one or more OH groups, and wherein $L^1$ and $L^2$ can be same or different, wherein $Z^1$ or $Z^2$ is a monovalent group selected from the group consisting of R, R', R", $R^1$; an alkylarylalkyl containing from 8 to 22 carbon atoms; an aryl ether containing from 6 to 22 carbon atoms; a cycloalkyl containing from 6 to 22 carbon atoms; a cycloalkylalkylene containing from 7 to 22 carbon atoms; a bicycloalkyl containing from 7 to 22 carbon atoms; cyclothioalkyl containing from 6 to 12 carbon atoms; an aryl containing 5 to 12 carbon atoms and a hetero atom selected from the group consisting of —N, —O, and —S; an alkyl aldehyde containing from 1 to 20 carbon atoms; and an alkylaryl aldehyde containing from 7 to 20 carbon atoms, and wherein $Z^1$ or $Z^2$ is optionally substituted by an alkyl of from 1 to 8 carbon atoms, wherein each $R^1$ is a monovalent unsaturated, unsubstituted or substituted alkenyl or alkynyl group selected from the group consisting of an alkenyl containing from 2 to 22 carbon atoms; a cycloalkenyl containing from 6 to 22 carbon atoms; a bicycloalkenylalkylene containing from 7 to 22 carbon atoms; an acrylate group; a methacrylate group; an alkynyl containing from 2 to 22 carbon atoms; and oxiranyl and carbonate derivatives of the respective $R^1$ groups; and oxiranyl groups containing 3 to 22 carbon atoms; carbonate groups containing from 4 to 23 carbon atoms; Cl, Br, I, —SH, —S—R, —OH, —O—R, —CN, —NCO, and blocked —NCO, $(X)_x(Y)_{3-x}$Si—, $R^6_xR'_{3-x}$Si—; a polyether group, carboxy (—COOH), diacids, diesters, a polyester group, nitro-alkyl-, cyano-alkyl-, acyl- or alkyl sulfonyl fluoride- groups and, an ionic group derived from an ester of a carboxylic acid or sulphonic acid, or phosphonic acid, phosphonate, phosphines, amines, a keto group, and betaines, and wherein R is as defined above, and the subscript x is an integer of from 1 to 3, X and Y are each selected from the group consisting of OH, OR', —N(R')$_2$, R'O(O)—O—, and R', wherein R' is as defined above, and X and Y can be same or different, and wherein each $R^6$ is an aryl containing from 6 to 10 carbon atoms, an arylalkyl containing from 7 to 12 carbon atoms, a cycloalkyl containing from 6 to 12 carbon atoms, a bicycloalkyl containing from 7 to 16 carbon atoms, an epoxy alkyl containing from 3 to 12 carbon atoms, an epoxy cycloalkyl containing from 6 to 12 carbon atoms, an epoxy bicycloalkyl containing from 7 to 16 carbon atoms, thiocycloalkyl containing from 6 to 12 carbon atoms, and an aryl containing from 5 to 12 carbon atoms, wherein the aryl, arylalkyl, or cycloalkyl contains hetero substitutions of one or more of a —N, —O, and —S— atom.

2. The coating composition of claim 1, wherein $R^1$ is selected from —C(O)—O—$R^3$, $(R^3O)_2$—P(O)—O—, $(R^3O)_2$—P(O)—, phosphonates $(R^3$—O$)_2$—P—, —NHR$^3$—CH$_2$—COOH, —NHR$^3$—CH$_2$—O—S(O)$_2$ (OH), —S—S(O)$_2$(OR$_3$), —N(R$^3$)$_2$, —P(R$^3$)$_2$, an acid addition salt of an amine, salts having quaternary —N$^+$R$^2_3$ or —P$^+$R$^2_3$ groups, an alkyl or aryl enamine of the formula (II):

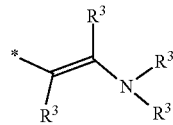

(II)

wherein $R^3$ is hydrogen or an alkyl of from 1 to 8 carbon atoms, and an alkenyl containing from 2 to 8 carbon atoms which is bonded via a single bond or a carbon bond of $L^1$ or $L^2$ to the silicon atom of the respective siloxy unit of the polyorganosiloxane (I).

3. The coating composition of claim 1, wherein $L^1$ or $L^2$ is a divalent alkylene group of from 2 to 12 carbon atoms.

4. The coating composition of claim 1, wherein one of $Z^1$ and $Z^2$ of formula (I) is a vinyl ester of neodecanoic acid or a vinyl ester of neononaoic acid and the remaining $Z^1$ or $Z^2$ is selected from the group consisting of alkenyl, alkoxy, hydroxyalkyl, $(X)_x(Y)_{3-x}$Si— where X, Y and x are as defined, —NCO, acrylate, methacrylate, epoxy containing 3 to 22 carbon atoms, —SR wherein R is as defined, hydroxyl, carboxy (—COOH), amino, a keto group, diacids, diesters, nitro-alkyl-, cyano-alkyl-, acyl- or alkyl sulfonyl fluoride groups, donor and acceptor groups in the Michael addition reaction.

5. The coating composition of claim 1, wherein the polyorganosiloxane of formula I is present in an amount from about 0.01 to about 30 percent by weight, based on the total weight of the coating composition.

6. The coating composition of claim 1, wherein the polyorganosiloxane of formula I is present in an amount from about 0.02 to about 20 percent by weight based on the total weight of the coating composition.

7. The coating composition of claim 1, further comprising one or more hardeners.

8. The coating composition of claim 1, wherein the organic binder is present in an amount from about 5 wt. % to about 99 wt. %, based on the total weight of the coating composition.

9. The coating composition of claim 8, wherein the organic binder is present in an amount from about 7 wt. % to about 95 wt. %, based on the total weight of the coating composition.

10. The coating composition of claim 1, wherein the organic binder is selected from a group consisting of acrylic resins, hydroxy acrylate resins, vinyl-acrylic resins, vinyl acetate/ethylene (VAE), alkyd resins, polyurethane, epoxy resins, latex, asphaltic, polyester, melamine-formaldehyde, phenol formaldehyde, polyamide, isocyanate, alkyds, melamine resins, silanes, siloxanes, monoalkoxysilane, dialkoxysilanes, trialkoxysilanes, and combinations thereof.

11. The coating composition of claim 10, wherein the organic binder is an acrylic binder comprising one or more monomers selected from the group consisting of butyl acrylate, methyl methacrylate, ethyl hexyl acrylate, styrene, vinyl toluene, acrylonitrile, vinyl acetate, acrylic acid, vinyl ester of neodecanoic acid, or a vinyl ester of neononaoic acid, and silane containing monomer.

12. The coating composition of claim 10, wherein the organic binder is selected from an epoxy resin binder or a siloxane binder.

13. The coating composition of claim 10, wherein the organic binder is a polyurethane binder based on aliphatic or aromatic polyols.

14. The coating composition of claim 1, further comprising at least one auxiliary component selected from the group consisting of filler, water, solvent, surfactant, dispersant, defoamer, coalescent, thickener, opaque polymer, biocide, colorant, anti-static agent, silicone-based additive and combinations thereof.

15. The coating composition of claim 14, wherein the filler is selected from the group consisting of titanium dioxide, clays, nano-clay, organo-clay, ground calcium carbonate, precipitated calcium carbonate, colloidal calcium carbonate, calcium carbonate treated with compounds containing a stearate moiety or stearic acid, fumed silica, precipitated silica, crushed quartz, ground quartz, alumina, aluminum hydroxide, ceramic and glass spheres, titanium hydroxide, kaolin, bentonite montmorillonite, diatomaceous earth, iron oxide, carbon black, graphite, talc, mica, pumice, wollastonite, dolomite, feldspar, colored pigment, and combinations thereof.

16. The coating composition of claim 14, wherein the solvent is selected from the group consisting of mineral spirits, acetone, turpentine, naphtha, toluene, methyl ethyl ketone, dimethylformamide, 2-butoxyethanol, glycol ether, ethylbenzene, xylene, n-butyl acetate, butanol, and combinations thereof.

17. A paint, varnish, lacquer, shellac or stain comprising the coating composition of claim 1.

18. A coated article having a coating comprising the coating composition of claim 1 disposed on a substrate, wherein the coating has a surface contact angle of water of from about 5 to about 180 degrees as determined by ASTM D7334.

19. The coated article of claim 18, wherein the substrate comprises metal, plastic, wood, concrete, glass, paper, brick, cement, clay, rocks, stones, fabric, ceramic, synthetic foam, gypsum, plaster of Paris, putty, stucco, or composites.

20. A process of making a coating composition comprising, combining:
(i) an organic binder; and
(ii) a polyorganosiloxane of formula (I):

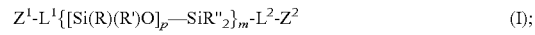

(I);

wherein the subscript p>9,
wherein the subscript m is an integer of from 1 to 5,
wherein each R, R' or R" is selected from the group consisting of a saturated hydrocarbon substituent selected from the group consisting of a monovalent alkyl containing from 1 to 22 carbon atoms, optionally substituted by F or a —OH group, an aryl containing from 6 to 22 carbon atoms, a polycyclic aryl containing from 8 to 22 carbon atoms, an alkylaryl containing from 7 to 23 carbon atoms, and an arylalkyl group containing from 7 to 22 carbon atoms, and H, or L$^1$-Z$^1$ or L$^2$-Z$^2$, and wherein each R, R' and R" can be same or different;

wherein, each $L^1$ or $L^2$ is selected from the group consisting of a single bond, a divalent alkylene group having at least two carbon atoms, optionally interrupted by one or more of —O—, —NR$^3$—C(O)—, and/or —NR$^3$—, —OC(O)NR$^3$—, —NR$^3$—C(O)—NR$^3$— moieties bonded via carbon bond of $L_1$ or $L^2$ to the silicon atom of the respective siloxy unit of the polyorganosiloxane (I), and optionally substituted by one or more OH groups, or is a trivalent group, and wherein $L^1$ and $L^2$ can be same or different, and wherein $R^3$ is hydrogen, Me$_3$Si— or an alkyl containing from 1 to 8 carbon atoms, wherein $Z^1$ or $Z^2$ is a monovalent group selected from the group consisting of R, R', R", $R^1$, an alkylarylalkyl containing from 8 to 22 carbon atoms, an aryl ether containing from 6 to 22 carbon atoms, a cycloalkyl containing from 6 to 22 carbon atoms, a cycloalkylalkylene containing from 7 to 22 carbon atoms, a bicycloalkyl containing from 7 to 22 carbon atoms, cyclothioalkyl containing from 6 to 12 carbon atoms, an aryl containing 5 to 12 carbon atoms and a hetero atom selected from the group consisting of —N, —O, and —S, an alkyl aldehyde containing from 1 to 20 carbon atoms, and an alkylaryl aldehyde containing from 7 to 20 carbon atoms, and wherein $Z^1$ or $Z^2$ is optionally substituted by an alkyl of from 1 to 8 carbon atoms, wherein each $R^1$ is a monovalent unsaturated, unsubstituted or substituted alkenyl or alkynyl group selected from the group consisting of an alkenyl containing from 2 to 22 carbon atoms; a cycloalkenyl containing from 6 to 22 carbon atoms; a bicycloalkenylalkylene containing from 7 to 22 carbon atoms; an acrylate group; a methacrylate group; an alkynyl containing from 2 to 22 carbon atoms; and oxiranyl and carbonate derivatives of the respective $R^1$ groups; and oxiranyl groups containing 3 to 22 carbon atoms; carbonate groups containing from 4 to 23 carbon atoms; Cl, Br, I, —SH, —S—R, —OH, —O—R, —CN, —NCO, and blocked —NCO, $(X)_x(Y)_{3-x}Si$—, $R^6_xR'_{3-x}Si$—; a polyether group, carboxy (—COOH), diacids, diesters, a polyester group, nitro-alkyl-, cyano-alkyl-, acyl- or alkyl sulfonyl fluoride- groups and, an ionic group derived from an ester of a carboxylic acid or sulphonic acid, or phosphonic acid, phosphonate, phosphines, amines, a keto group, and betaines, and wherein R is as defined above, and the subscript x is an integer of from 1 to 3, X and Y are each selected from the group consisting of OH, OR', —N(R')$_2$, R'O(O)—O—, and R', wherein R' is as defined above, and X and Y can be same or different, and wherein each $R^6$ is an aryl containing from 6 to 10 carbon atoms, an arylalkyl containing from 7 to 12 carbon atoms, a cycloalkyl containing from 6 to 12 carbon atoms, a bicycloalkyl containing from 7 to 16 carbon atoms, an epoxy alkyl containing from 3 to 12 carbon atoms, an epoxy cycloalkyl containing from 6 to 12 carbon atoms, an epoxy bicycloalkyl containing from 7 to 16 carbon atoms, thiocycloalkyl containing from 6 to 12 carbon atoms, and an aryl containing from 5 to 12 carbon atoms, wherein the aryl, arylalkyl, or cycloalkyl contains hetero substitutions of one or more of a —N, —O, and —S— atom.

* * * * *